United States Patent
Lee et al.

(10) Patent No.: US 11,435,977 B2
(45) Date of Patent: Sep. 6, 2022

(54) METHOD FOR TRANSMITTING AND RECEIVING AUDIO DATA RELATED TO TRANSITION EFFECT AND DEVICE THEREFOR

(71) Applicant: LG ELECTRONICS INC., Seoul (KR)

(72) Inventors: Tungchin Lee, Seoul (KR); Sejin Oh, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/047,616

(22) PCT Filed: Apr. 22, 2019

(86) PCT No.: PCT/KR2019/004821
§ 371 (c)(1),
(2) Date: Oct. 14, 2020

(87) PCT Pub. No.: WO2019/203627
PCT Pub. Date: Oct. 24, 2019

(65) Prior Publication Data
US 2021/0132898 A1 May 6, 2021

(30) Foreign Application Priority Data
Apr. 20, 2018 (KR) .................. 10-2018-0045841

(51) Int. Cl.
*G06F 3/16* (2006.01)
*G06F 3/0346* (2013.01)
(Continued)

(52) U.S. Cl.
CPC ............ *G06F 3/165* (2013.01); *G06F 3/0346* (2013.01); *G06T 19/006* (2013.01); *H04N 21/47217* (2013.01)

(58) Field of Classification Search
CPC combination set(s) only.
See application file for complete search history.

(56) References Cited

U.S. PATENT DOCUMENTS 6,710,785 B1 * 3/2004 Asai .......................... G06T 1/00
715/719
2011/0292244 A1 12/2011 Deever
(Continued)

FOREIGN PATENT DOCUMENTS

KR 10-2017-0023870 3/2017
KR 10-2017-0095260 8/2017

OTHER PUBLICATIONS

PCT International Application No. PCT/KR2019/004821, International Search Report dated Jul. 26, 2019, 10 pages.

*Primary Examiner* — Phung-Hoang J Nguyen
(74) *Attorney, Agent, or Firm* — Lee Hong Degerman Kang & Waimey

(57) ABSTRACT

The method for receiving audio data by a device for receiving audio data, according to the present disclosure, comprises the steps of: receiving, from a device for transmitting audio data, playback information of three-dimensional audio content and an encoded three-dimensional audio signal of the three-dimensional audio content; decoding the encoded three-dimensional audio signal; and rendering the decoded three-dimensional audio signal on the basis of the playback information of the three-dimensional audio content, wherein the playback information comprises information about a transition effect of the three-dimensional audio content.

13 Claims, 18 Drawing Sheets

(51) Int. Cl.
   *G06T 19/00*      (2011.01)
   *H04N 21/472*     (2011.01)

(56) References Cited

U.S. PATENT DOCUMENTS

2015/0089553 A1    3/2015  Hunt et al.
2018/0012611 A1    1/2018  Lowe et al.
2018/0206057 A1*   7/2018  Kim ..................... G10L 19/008

* cited by examiner

METHOD FOR TRANSMITTING AND RECEIVING AUDIO DATA RELATED TO TRANSITION EFFECT AND DEVICE THEREFOR

CROSS-REFERENCE TO RELATED APPLICATIONS

This application is the National Stage filing under 35 U.S.C. 371 of International Application No. PCT/KR2019/004821, filed on Apr. 22, 2019, which claims the benefit of earlier filing date and right of priority to Korean Application No. 10-2018-0045841, filed on Apr. 20, 2018, the contents of which are all hereby incorporated by reference herein in their entirety.

TECHNICAL FIELD

The present disclosure relates to audio data and, more particularly, to a method and apparatus for transmitting and receiving audio data about a transition effect.

BACKGROUND ART

A Virtual reality (VR) system provides a user with sensory experiences through which the user may feel as if they were in an electronically projected environment. An Augmented Reality (AR) system overlays a three-dimensional (3D) virtual image on an actual image or background of a real world, thereby allowing a user to feel as if the user is placed in an environment where virtual reality and the real world are mixed. A system for providing VR or AR may be further improved in order to provide higher-quality images and spatial sound. The VR or AR system may enable the user to interactively enjoy VR or AR content.

In a situation in which demand for VR or AR content gradually increases, the necessity of devising a method capable of efficiently transmitting and receiving audio data between an apparatus for generating an audio signal for reproduction of VR or AR content and an apparatus for reproducing VR or AR content is also increasing.

Currently, studies on techniques (e.g., 3 degrees of freedom plus (3DoF+) or 6DoF) capable of experiencing VR content at various positions, beyond a restriction on a specific space or a specific position, are being conducted. As such, there is growing interest in the concept of a hot spot in which scenes are captured from multiple positions. In order to experience more immersive VR content, a high degree of freedom needs to be provided to users using VR content.

DETAILED DESCRIPTION OF THE DISCLOSURE

Technical Problems

An object of the present disclosure is to provide a method and apparatus for transmitting and receiving audio data.

Another object of the present disclosure is to provide a method and apparatus for transmitting and receiving audio data about a transition effect.

Another object of the present disclosure is to provide an audio data transmission apparatus for generating reproduction information including information about a transition effect and transmitting the reproduction information to an audio data reception apparatus, and an operation method thereof.

Another object of the present disclosure is to provide an audio data reception apparatus for receiving reproduction information including information about a transition effect from an audio data transmission apparatus, and an operation method thereof.

Another object of the present disclosure is to provide a method and apparatus for transmitting and receiving 3-dimensional (3D) audio data.

Another object of the present disclosure is to provide reproduction information for audio content of 3DoF, 3DoF+, or 6DoF based on an audio decoder and an audio encoder according to MPEG-H.

Another object of the present disclosure is to apply technology for allowing an audio data transmission apparatus to acquire information about scenes at a plurality of positions so that a user using an audio data reception apparatus may transition to a desired position in VR content.

Technical Solutions

According to an aspect of the present disclosure, provided herein is a method of receiving audio data, performed by an audio data reception apparatus. The method includes receiving reproduction information of three-dimensional (3D) audio content and an encoded 3D audio signal of the 3D audio content from an audio data transmission apparatus, decoding the encoded 3D audio signal, and rendering the decoded 3D audio signal based on the reproduction information of the 3D audio content. The reproduction information includes information about a transition effect of the 3D audio content.

In another aspect of the present disclosure, provided herein is an audio data reception apparatus for receiving audio data. The audio data reception apparatus includes a receiver configured to receive reproduction information of three-dimensional (3D) audio content and an encoded 3D audio signal of the 3D audio content from an audio data transmission apparatus, a decoder configured to decode the encoded 3D audio signal, and a renderer configured to render the decoded 3D audio signal based on the reproduction information of the 3D audio content. The reproduction information includes information about a transition effect of the 3D audio content.

In another aspect of the present disclosure, provided herein is a method of transmitting audio data, performed by an audio data transmission apparatus. The method includes generating reproduction information of three-dimensional (3D) audio content; encoding a 3D audio signal of the 3D audio content; and transmitting the encoded 3D audio signal and the generated reproduction information of the 3D audio content to an audio data reception apparatus. The reproduction information includes information about a transition effect of the 3D audio content.

In another aspect of the present disclosure, provided herein is an audio data transmission apparatus for transmitting audio data. The audio data transmission apparatus includes a generator configured to generate reproduction information of three-dimensional (3D) audio content, an audio signal encoder configured to encode a 3D audio signal of the 3D audio content, and a transmitter configured to transmit the encoded 3D audio signal and the generated reproduction information of the 3D audio content to an audio data reception apparatus. The reproduction information includes information about a transition effect of the 3D audio content.

Advantageous Effects

According to the present disclosure, a method in which an audio data transmission apparatus and an audio data reception apparatus are capable of efficiently transmitting and receiving audio data about 3D audio content is provided.

According to the present disclosure, a method in which an audio data transmission apparatus and an audio data reception apparatus are capable of efficiently transmitting and receiving audio data about VR or AR content is provided.

According to the present disclosure, a method of more efficiently reproducing 3D audio content based on reproduction information of the 3D audio content received by an audio data reception apparatus from an audio data transmission apparatus is provided.

According to the present disclosure, a method of more efficiently rendering (or reproducing) a 3D audio signal for VR or AR content based on reproduction information of the VR or AR content received by an audio data reception apparatus from an audio data transmission apparatus is provided.

DESCRIPTION OF DRAWINGS

FIG. 9 is a diagram illustrating another example of a 3D audio stream.

BEST MODE FOR CARRYING OUT THE DISCLOSURE

Figure 1:
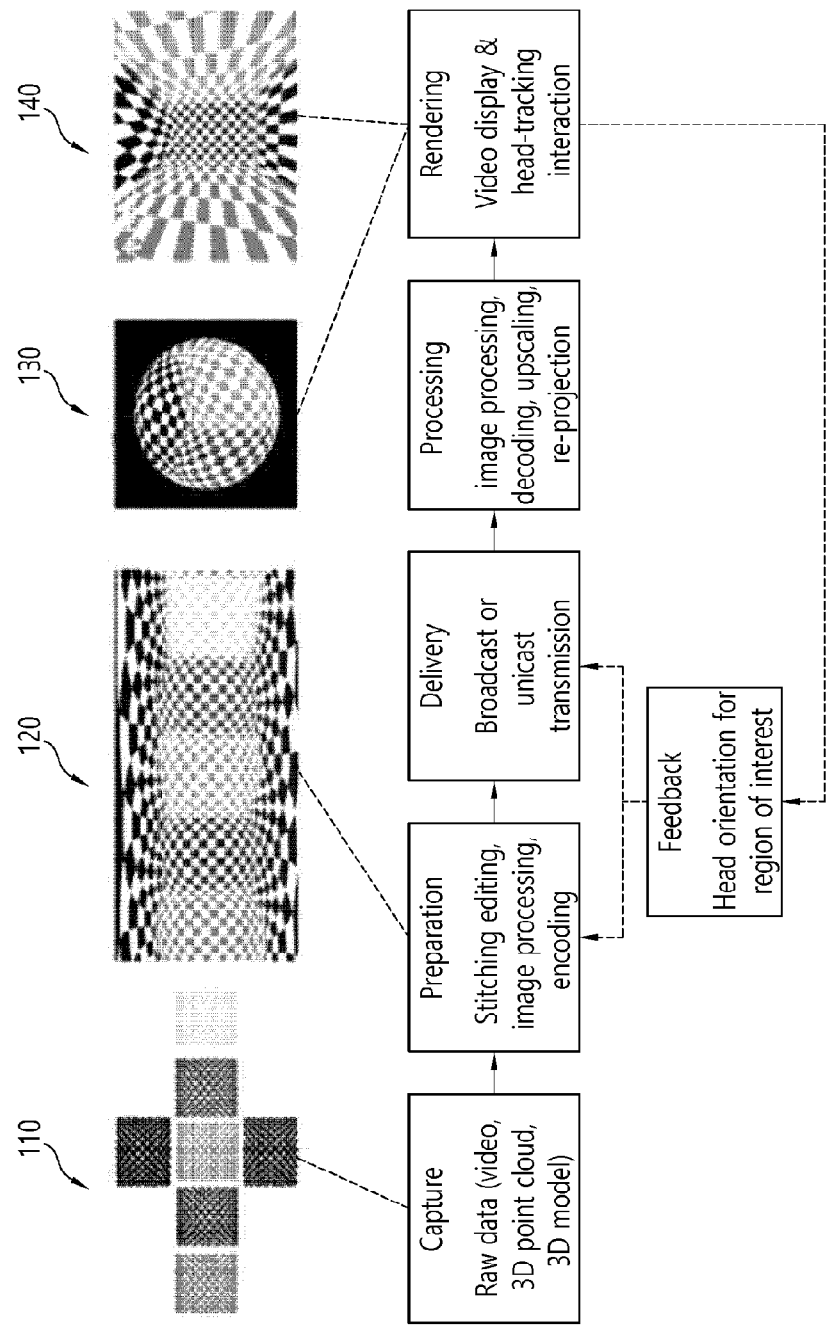
FIG. 1 is a diagram showing an overall architecture for providing 360 content according to an embodiment.

According to an aspect of the present disclosure, provided herein is a method of receiving audio data, performed by an audio data reception apparatus. The method includes receiving reproduction information of three-dimensional (3D) audio content and an encoded 3D audio signal of the 3D audio content from an audio data transmission apparatus, decoding the encoded 3D audio signal, and rendering the decoded 3D audio signal based on the reproduction information of the 3D audio content. The reproduction information includes information about a transition effect of the 3D audio content.

MODE FOR CARRYING OUT THE DISCLOSURE

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the disclosure without departing from the concept of the disclosure.

Hereinafter, preferred embodiments of the present disclosure will be described in more detail with reference to the attached drawings. Hereinafter, the same reference numbers will be used throughout this specification to refer to the same components and redundant description of the same component may be omitted.

FIG. 1 is a diagram showing an overall architecture for providing 360 content according to an embodiment.

The present disclosure proposes a method for providing 360-degree content for providing Virtual Reality (VR) to a user. VR may mean technology or an environment for replicating an actual or virtual environment or may mean the actual or virtual environment itself. VR artificially allow a user to experience with senses, and, through this experience, the user may feel as if he/she were in an electronically projected environment.

The term "360 content" means all content for realizing and providing VR, and may include 360-degree video and/or 360 audio. The term "360-degree video" and/or "360 audio" may be called a three-dimensional video and/or a three-dimensional audio. The term "360-degree video" may mean video or image content that is captured or reproduced in all directions (360 degrees) at the same time, which is necessary to provide VR. Hereinafter, the 360-degree video may refer to a 260-video. The 360-degree video may refer to a video or an image that appears in various kinds of 3D spaces depending on 3D models. For example, the 360-degree video may appear on a spherical surface. The term "360 audio", which is audio content for providing VR, may refer to spatial audio content in which the origin of a sound is recognized as being located in a specific 3D space. The 360 audio may be called 3D audio. The 360 content may be generated, processed, and transmitted to users, who may enjoy a VR experience using the 360 content. Hereinafter, 360 video may be called an omnidirectional video, and the 360 image may be called an omnidirectional image.

In order to provide a 360-degree video, the 360-degree video may be captured using at least one camera. The captured 360-degree video may be transmitted through a series of processes, and a reception side may process and render the received data into the original 360-degree video. As a result, the 360-degree video may be provided to a user.

Specifically, the overall processes of providing the 360-degree video may include a capturing process, a preparation process, a delivery process, a processing process, a rendering process, and/or a feedback process.

The capture process may refer to a process of capturing images or videos for a plurality of viewpoints through one or more cameras. Image/video data 110 shown in FIG. 1 may be generated through the capture process. Each plane of 110 in FIG. 1 may represent an image/video for each viewpoint. A plurality of captured images/videos may be referred to as raw data. Metadata related to capture may be generated during the capture process.

For capture, a special camera for VR may be used. When a 360 video with respect to a virtual space generated by a computer is provided according to an embodiment, capture through an actual camera may not be performed. In this case, a process of simply generating related data may substitute for the capture process.

The preparation process may be a process of processing captured images/videos and metadata generated in the capture process. Captured images/videos may be subjected to a stitching process, a projection process, a region-wise packing process and/or an encoding process during the preparation process.

First, each image/video may be subjected to the stitching process. The stitching process may be a process of connecting captured images/videos to generate one panorama image/video or spherical image/video.

Subsequently, stitched images/videos may be subjected to the projection process. In the projection process, the stitched images/videos may be projected on 2D image. The 2D image may be called a 2D image frame according to context. Projection on a 2D image may be referred to as mapping to a 2D image. Projected image/video data may have the form of a 2D image 120 in FIG. 1.

The video data projected on the 2D image may undergo the region-wise packing process in order to improve video coding efficiency. The region-wise packing process may be a process of individually processing the video data projected on the 2D image for each region. Here, the term "regions" may indicate divided parts of the 2D image on which the 360-degree video data are projected. In some embodiments, regions may be partitioned by uniformly or arbitrarily dividing the 2D image. Also, in some embodiments, regions may be partitioned depending on a projection scheme. The region-wise packing process is optional, and thus may be omitted from the preparation process.

In some embodiments, in order to improve video coding efficiency, this process may include a process of rotating each region or rearranging the regions on the 2D image. For example, the regions may be rotated such that specific sides of the regions are located so as to be adjacent to each other, whereby coding efficiency may be improved.

In some embodiments, this process may include a process of increasing or decreasing the resolution of a specific region in order to change the resolution for areas on the 360-degree video. For example, regions corresponding to relatively important areas in the 360-degree video may have higher resolution than other regions. The video data projected on the 2D image or the region-wise packed video data may undergo the encoding process via a video codec.

In some embodiments, the preparation process may further include an editing process. At the editing process, image/video data before and after projection may be edited. At the preparation process, metadata for stitching/projection/encoding/editing may be generated in the same manner. In addition, metadata for the initial viewport of the video data projected on the 2D image or a region of interest (ROI) may be generated.

The delivery process may be a process of processing and delivering the image/video data that have undergone the preparation process and the metadata. Processing may be performed based on an arbitrary transport protocol for delivery. The data that have been processed for delivery may be delivered through a broadcast network and/or a broadband connection. The data may be delivered to the reception side in an on-demand manner. The reception side may receive the data through various paths.

The processing process may be a process of decoding the received data and re-projecting the projected image/video data on a 3D model. In this process, the image/video data projected on the 2D image may be re-projected in a 3D space. Depending on the context, this process may be called mapping or projection. At this time, the mapped 3D space may have different forms depending on the 3D model. For example, the 3D model may be a sphere, a cube, a cylinder, or a pyramid.

In some embodiments, the processing process may further include an editing process and an up-scaling process. At the editing process, the image/video data before and after re-projection may be edited. In the case where the image/video data are down-scaled, the size of the image/video data may be increased through up-scaling at the up-scaling process. As needed, the size of the image/video data may be decreased through down-scaling.

The rendering process may be a process of rendering and displaying the image/video data re-projected in the 3D space. Depending on the context, a combination of re-projection and rendering may be expressed as rendering on the 3D model. The image/video re-projected on the 3D model (or rendered on the 3D model) may have the form as indicated by 130 in FIG. 1. The image/video indicated by 130 in FIG. 1 is re-projected on a spherical 3D model. The user may view a portion of the rendered image/video through a VR display. At this time, the portion of the image/video viewed by the user may have the form shown in (140) of FIG. 1.

The feedback process may be a process of transmitting various kinds of feedback information that may be acquired at a display process to a transmission side. Interactivity may be provided in enjoying the 360-degree video through the feedback process. In some embodiments, head orientation information, information about a viewport, which indicates the area that is being viewed by the user, etc. may be transmitted to the transmission side in the feedback process. In some embodiments, the user may interact with what is realized in the VR environment. In this case, information related to the interactivity may be provided to the transmission side or to a service provider side at the feedback process. In some embodiments, the feedback process may not be performed.

The head orientation information may be information about the position, angle, and movement of the head of the user. Information about the area that is being viewed by the user in the 360-degree video, i.e. the viewport information, may be calculated based on this information.

The viewport information may be information about the area that is being viewed by the user in the 360-degree video. Gaze analysis may be performed therethrough, and therefore it is possible to check the manner in which the user enjoys the 360-degree video, the area of the 360-degree video at which the user gazes, and the amount of time during which the user gazes at the 360-degree video. The gaze analysis may be performed on the reception side and may be delivered to the transmission side through a feedback channel. An apparatus, such as a VR display, may extract a viewport area based on the position/orientation of the head of the user, a vertical or horizontal FOV that is supported by the apparatus, etc.

In some embodiments, the feedback information may not only be delivered to the transmission side, but may also be used in the reception side. That is, the decoding, re-projection, and rendering processes may be performed in the reception side using the feedback information. For example, only the portion of the 360-degree video that is being viewed by the user may be decoded and rendered first using the head orientation information and/or the viewport information.

Here, the viewport or the viewport area may be the portion of the 360-degree video that is being viewed by the user. The viewport, which is the point in the 360-degree video that is being viewed by the user, may be the very center of the viewport area. That is, the viewport is an area based on the viewport. The size or shape of the area may be set by a field of view (FOV), a description of which will follow.

In the entire architecture for 360-degree video provision, the image/video data that undergo a series of capturing/projection/encoding/delivery/decoding/re-projection/rendering processes may be called 360-degree video data. The term "360-degree video data" may be used to conceptually include metadata or signaling information related to the image/video data.

In order to store and transmit media data such as the above-described audio or video, a formalized media file format may be defined. In some embodiments, the media file according to the present disclosure may have a file format based on ISO base media file format (ISO BMFF).

Figure 2:
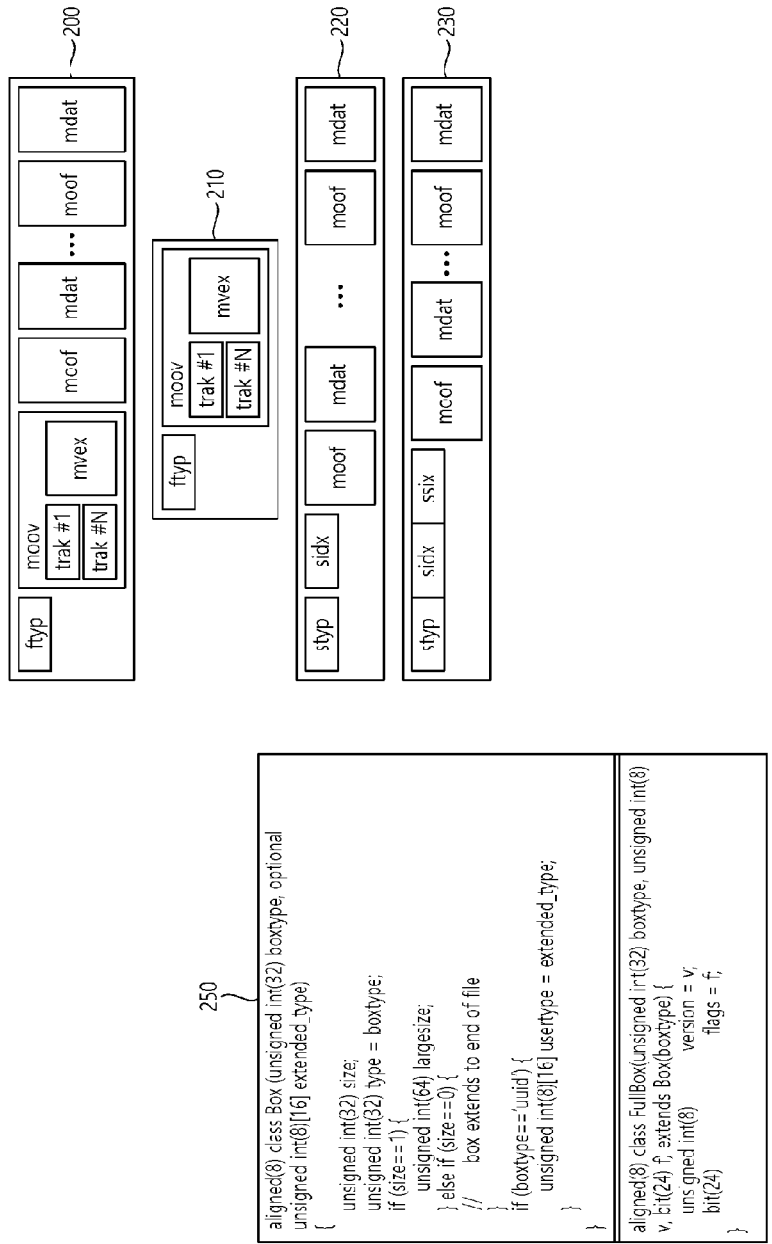
FIGS. 2 and 3 are diagrams illustrating the structure of a media file according to an embodiment.
Figure 3:
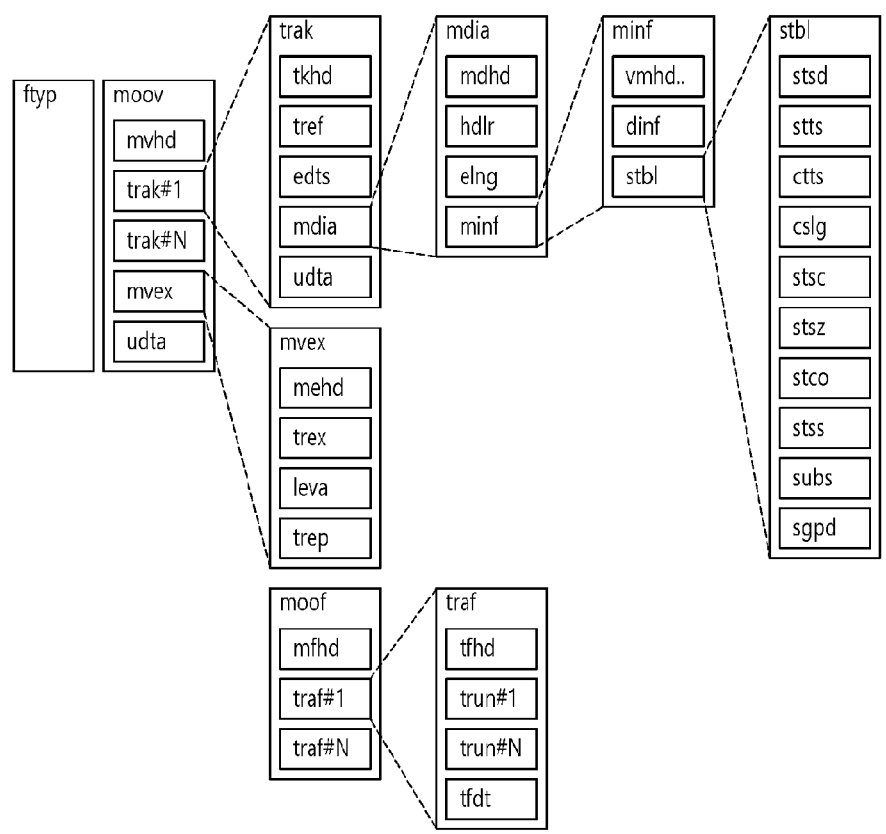

FIGS. 2 and 3 are diagrams illustrating the structure of a media file according to an embodiment.

The media file according to an embodiment may include at least one box. Here, a box may be a data block or an object including media data or metadata related to media data. Boxes may be in a hierarchical structure and thus data may be classified and media files may have a format suitable for storage and/or transmission of large-capacity media data. Further, media files may have a structure which allows users to easily access media information such as moving to a specific point of media content.

The media file according to an embodiment may include an ftyp box, a moov box and/or an mdat box.

The ftyp box (file type box) may provide file type or compatibility related information about the corresponding media file. The ftyp box may include configuration version information about media data of the corresponding media file. A decoder may identify the corresponding media file with reference to ftyp box.

The moov box (movie box) may be a box including metadata about media data of the corresponding media file. The moov box may serve as a container for all metadata. The moov box may be a highest layer among boxes related to metadata. According to an embodiment, only one moov box may be present in a media file.

The mdat box (media data box) may be a box containing actual media data of the corresponding media file. Media data may include audio samples and/or video samples. The mdat box may serve as a container containing such media samples.

According to an embodiment, the aforementioned moov box may further include an mvhd box, a trak box and/or an mvex box as lower boxes.

The mvhd box (movie header box) may include information related to media presentation of media data included in the corresponding media file. That is, the mvhd box may include information such as a media generation time, change time, time standard and period of corresponding media presentation.

The trak box (track box) may provide information about a track of corresponding media data. The trak box may include information such as stream related information, presentation related information and access related information about an audio track or a video track. A plurality of trak boxes may be present depending on the number of tracks.

The trak box may further include a tkhd box (track head box) as a lower box. The tkhd box may include information about the track indicated by the trak box. The tkhd box may include information such as a generation time, a change time and a track identifier of the corresponding track.

The mvex box (movie extend box) may indicate that the corresponding media file may have a moof box which will be described later. To recognize all media samples of a specific track, moof boxes may need to be scanned.

According to an embodiment, the media file according to an embodiment may be divided into a plurality of fragments (200). Accordingly, the media file may be fragmented and stored or transmitted. Media data (mdat box) of the media file may be divided into a plurality of fragments and each fragment may include a moof box and a divided mdat box. According to an embodiment, information of the ftyp box and/or the moov box may be required to use the fragments.

The moof box (movie fragment box) may provide metadata about media data of the corresponding fragment. The moof box may be a highest-layer box among boxes related to metadata of the corresponding fragment.

The mdat box (media data box) may include actual media data as described above. The mdat box may include media samples of media data corresponding to each fragment corresponding thereto.

According to an embodiment, the aforementioned moof box may further include an mfhd box and/or a traf box as lower boxes.

The mfhd box (movie fragment header box) may include information about correlation between divided fragments. The mfhd box may indicate the order of divided media data of the corresponding fragment by including a sequence number. Further, it is possible to check whether there is missed data among divided data using the mfhd box.

The traf box (track fragment box) may include information about the corresponding track fragment. The traf box may provide metadata about a divided track fragment included in the corresponding fragment. The traf box may provide metadata such that media samples in the corresponding track fragment may be decoded/reproduced. A plurality of traf boxes may be present depending on the number of track fragments.

According to an embodiment, the aforementioned traf box may further include a tfhd box and/or a trun box as lower boxes.

The tfhd box (track fragment header box) may include header information of the corresponding track fragment. The tfhd box may provide information such as a basic sample size, a period, an offset and an identifier for media samples of the track fragment indicated by the aforementioned traf box.

The trun box (track fragment run box) may include information related to the corresponding track fragment. The trun box may include information such as a period, a size and a reproduction time for each media sample.

The aforementioned media file and fragments thereof may be processed into segments and transmitted. Segments may include an initialization segment and/or a media segment.

A file of the illustrated embodiment 210 may include information related to media decoder initialization except media data. This file may correspond to the aforementioned initialization segment, for example. The initialization segment may include the aforementioned ftyp box and/or moov box.

A file of the illustrated embodiment 220 may include the aforementioned fragment. This file may correspond to the aforementioned media segment, for example. The media segment may further include an styp box and/or an sidx box.

The styp box (segment type box) may provide information for identifying media data of a divided fragment. The styp box may serve as the aforementioned ftyp box for a divided fragment. According to an embodiment, the styp box may have the same format as the ftyp box.

The sidx box (segment index box) may provide information indicating an index of a divided fragment. Accordingly, the order of the divided fragment may be indicated.

According to an embodiment 230, an ssix box may be further included. The ssix box (sub-segment index box) may provide information indicating an index of a sub-segment when a segment is divided into sub-segments.

Boxes in a media file may include more extended information based on a box or a FullBox as shown in the illustrated embodiment 250. In the present embodiment, a size field and a largesize field may represent the length of the corresponding box in bytes. A version field may indicate the version of the corresponding box format. A type field may indicate the type or identifier of the corresponding box. A flags field may indicate a flag associated with the corresponding box.

Meanwhile, fields (properties) related to 360-degree video according to an embodiment may be included in a DASH-based adaptive streaming model to be transmitted.

Figure 4:
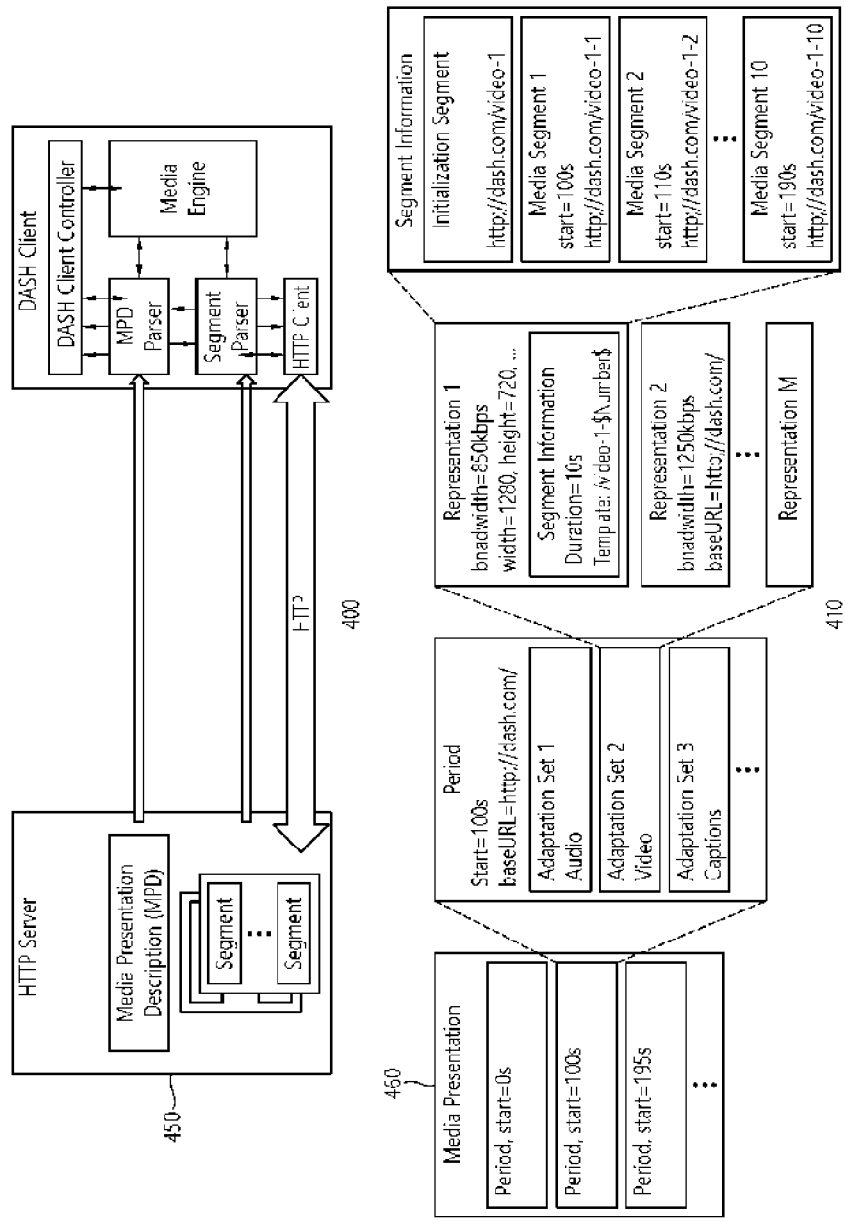
FIG. 4 is a diagram illustrating the overall operation of a Dynamic Adaptive Streaming over HTTP (DASH)-based adaptive streaming model.

FIG. 4 is a diagram illustrating the overall operation of a DASH-based adaptive streaming model. A DASH-based adaptive streaming model according to the embodiment shown in (400) describes the operation between an HTTP server and a DASH client. Here, Dynamic Adaptive Streaming over HTTP (DASH), which is a protocol for supporting HTTP-based adaptive streaming, may dynamically support streaming depending on network conditions. As a result, AV content may be reproduced without interruption.

First, the DASH client may acquire MPD. The MPD may be delivered from a service provider such as an HTTP server. The DASH client may request a segment described in the MPD from the server using information about access to the segment. Here, this request may be performed in consideration of network conditions.

After acquiring the segment, the DASH client may process the segment using a media engine, and may display the segment on a screen. The DASH client may request and acquire a necessary segment in real-time consideration of reproduction time and/or network conditions (Adaptive Streaming). As a result, content may be reproduced without interruption.

Media Presentation Description (MPD) is a file including detailed information enabling the DASH client to dynamically acquire a segment, and may be expressed in the form of XML.

A DASH client controller may generate a command for requesting MPD and/or a segment in consideration of network conditions. In addition, this controller may perform control such that the acquired information may be used in an internal block such as the media engine.

An MPD parser may parse the acquired MPD in real time. In doing so, the DASH client controller may generate a command for acquiring a necessary segment.

A segment parser may parse the acquired segment in real time. The internal block such as the media engine may perform a specific operation depending on information included in the segment.

An HTTP client may request necessary MPD and/or a necessary segment from the HTTP server. In addition, the HTTP client may deliver the MPD and/or segment acquired from the server to the MPD parser or the segment parser.

The media engine may display content using media data included in the segment. In this case, information of the MPD may be used.

A DASH data model may have a hierarchical structure (410). Media presentation may be described by the MPD. The MPD may describe the temporal sequence of a plurality of periods making media presentation. One period may indicate one section of the media content.

In one period, data may be included in adaptation sets. An adaptation set may be a set of media content components that may be exchanged with each other. Adaptation may include a set of representations. One representation may correspond to a media content component. In one representation, content may be temporally divided into a plurality of segments. This may be for appropriate access and delivery. A URL of each segment may be provided in order to access each segment.

The MPD may provide information related to media presentation. A period element, an adaptation set element, and a representation element may describe a corresponding period, adaptation set, and representation, respectively. One representation may be divided into sub-representations. A sub-representation element may describe a corresponding sub-representation.

Here, common attributes/elements may be defined. The common attributes/elements may be applied to (included in) the adaptation set, the representation, and the sub-representation. EssentialProperty and/or SupplementalProperty may be included in the common attributes/elements.

EssentialProperty may be information including elements considered to be essential to process data related to the media presentation. SupplementalProperty may be information including elements that may be used to process data related to the media presentation. In some embodiments, in the case where signaling information, a description of which will follow, is delivered through the MPD, the signaling information may be delivered while being defined in EssentialProperty and/or SupplementalProperty.

The above description given with reference to FIGS. 1 to 4 relates to 3D video and 3D audio for implementing VR or AR content. Hereinbelow, a processing process of 3D audio data in relation to an embodiment of the present disclosure will be described in more detail.

Figure 5:
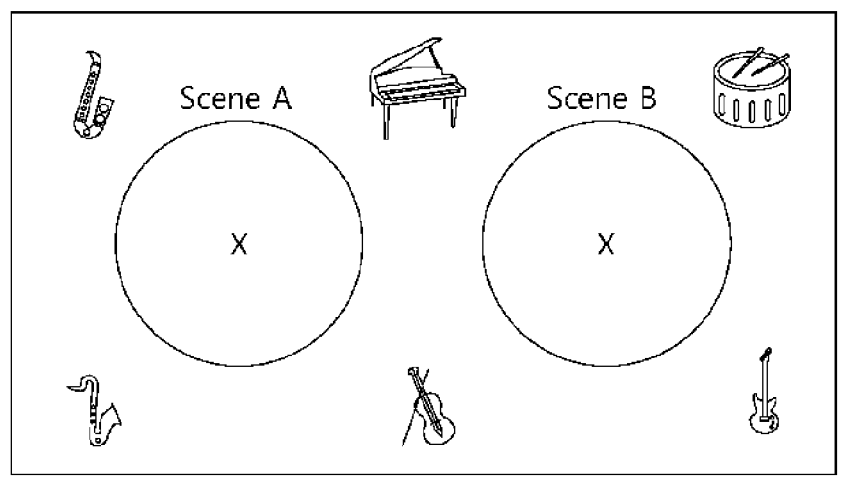
FIG. 5 is a diagram illustrating an example of a reproduction space of 3D audio content.

FIG. 5 is a diagram illustrating an example of a reproduction space of 3D audio content.

In this specification, the term "audio content" may mean media content such as video, 360 video, VR content, and AR content, including audio information. Furthermore, the term "3D audio content" may mean 3D media content such as 360 video, VR content, and AR content, including audio information.

In the present specification, the term "audio data transmission apparatus" may mean an apparatus for transmitting audio data, such as an audio signal and metadata for audio. The term "3D audio data transmission apparatus" may mean an apparatus for transmitting 3D audio data, such as a 3D audio signal and metadata for 3D audio. However, the audio data transmission apparatus does not always only transmit audio data to an audio data reception apparatus etc. and may receive audio data from the audio data reception apparatus in some cases. The audio data transmission apparatus may be an apparatus that is equal/similar to a transmission stage, a transmitter, a transmission apparatus, or a content creation stage described throughout the present specification, or may be interpreted as including the transmission stage, the transmitter, the transmission apparatus, or the content creation stage or as being included in the transmission stage, the transmitter, the transmission apparatus, or the content creation stage. The audio data transmission apparatus, the transmission stage, the transmitter, the transmission apparatus, or the content creation stage may be, for example, a network, a cloud server, a base station, a Set-Top Box (STB), a Personal Computer (PC), a User Equipment (UE), a desktop computer, a TV, a notebook computer, etc., or may be a configuration or a module included in the enumerated devices. Further, devices similar to the above enumerated devices may also operate as the audio data transmission apparatus, the transmission stage, the transmitter, the transmission apparatus, or the content creation stage. Examples of the audio data transmission apparatus, the transmission stage, the transmitter, the transmission apparatus, or the content creation stage are not limited to the above enumerated devices.

In the present specification, the term "audio data reception apparatus" may mean an apparatus for receiving audio data, such as an audio signal and metadata for audio. The term "3D audio data reception apparatus" may mean an apparatus for receiving 3D audio data, such as a 3D audio signal and metadata for 3D audio. However, the audio data reception apparatus does not always only receive audio data from an audio data transmission apparatus etc. and may transmit audio data to the audio data transmission apparatus in some cases. The audio data reception apparatus may be an apparatus that is equal/similar to a reception stage, a receiver, or a reception apparatus described throughout the present specification, or may be interpreted as including the reception stage, the receiver, or the reception apparatus or as being included in the reception stage, the receiver, or the reception apparatus. The audio data reception apparatus, the reception stage, the receiver, or the reception apparatus may be, for example, a headphone, an earphone, a speaker, a Head-Mounted Display (HMD), a UE, an STB, a network, a server, a PC, a desktop computer, a notebook computer, a camera, a camcorder, a TV, etc. or may be a configuration or a module included in the enumerated devices. Further, devices similar to the above enumerated devices may also operate as the audio data reception apparatus, the reception stage, the receiver, or the reception apparatus. Examples of the audio data reception apparatus, the reception stage, the receiver, or the reception apparatus are not limited to the above enumerated devices.

In an embodiment, a 3D audio data reception apparatus (or a 3D audio data decoding apparatus) according to MPEG-H may support VR content in 3DoF and 3DoF+ environments and also support VR content in a 6DoF environment. In an example, a transition effect may be applied when a scene is changed in VR content, and information about the transition effect may be signaled in order to apply the transition effect.

Referring to FIG. 5, two scenes (Scene A and Scene B) are captured in an arbitrary space. A sense of direction and the size of a sound source of each of instruments illustrated in FIG. 5 may vary with a position at which capture is performed. Therefore, when a user moves the position thereof from Scene A to Scene B, related position information (or scene information) should be signaled and factors that may occur in the process of moving the position may also need to be considered. The factors that may occur in the process of moving the position may include, for example, sound effects when considered in terms of audio. In embodiments according to the present disclosure, information about a transition effect may be signaled by considering that an audio scene is changed when the user changes the position thereof.

In order to cause the user to experience higher immersion in a VR environment in which the user may move the position thereof, it is necessary to reproduce a scene suitable for the position (here, only an audio scene is considered) with reference to the position of the user. As an example, in FIG. 5, assuming that the user is located at a position at which Scene A is captured, Scene A needs to be reproduced and, assuming that the user is located at a position at which Scene B is captured, Scene B needs to be reproduced. Therefore, in an environment in which the user may move, various scenes should be necessarily captured and a scene based on the position of the user need to be appropriately selected and reproduced.

Basically, considering that the user may move in the VR environment, such condition may be regarded as a six degrees of freedom (6DoF) environment. However, when a receiver that may interact with content such as games is used, the user may make a request to the receiver for one of several scenes randomly captured in advance. Then, the user may be immediately transported to the corresponding scene or may designate a desired position to be transported to the position. In other words, the user may be transported from a current position to another position. This may be generally regarded as the 6DoF environment but may also be considered as a 3DoF environment in that the user does not move the position thereof by themselves Although standards for the 3DoF+ environment are in progress in current MPEG and 3GPP, studies are also being conducted on methods that may be considered when scenes transition in consideration of a situation in which scenes may be changed in a more restrictive environment. Generally, in an audio scene in the 3DoF environment and the 3DoF+ environment, a significant change is not sensed in a cognitive aspect unlike a video scene, so that technology of the 3DoF environment may be equally applied to the 3DoF+ environment. However, in an environment in which a scene may transition, the audio scene may also be significantly changed depending on a transitioning position.

Figure 6:
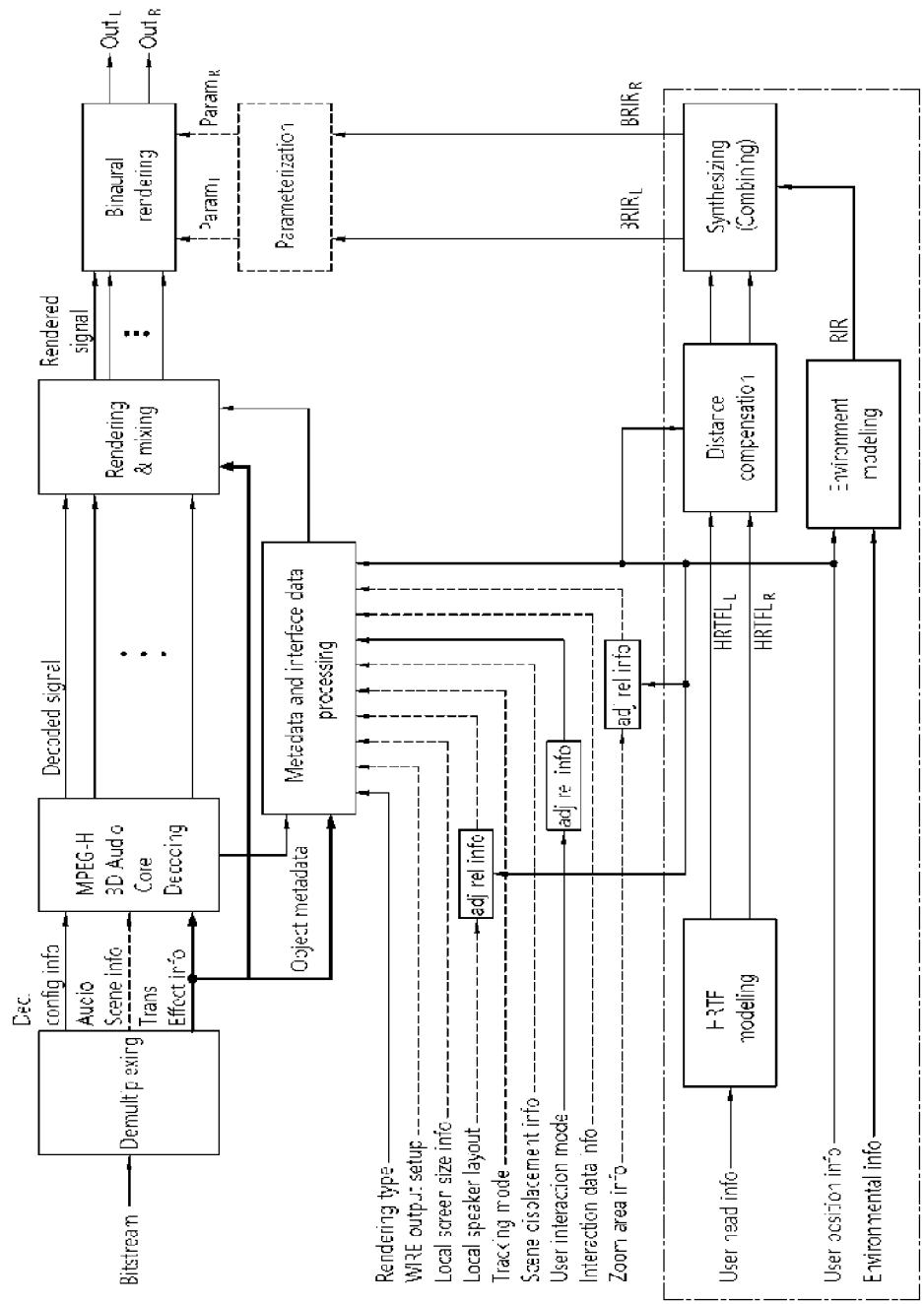
FIG. 6 is a block diagram illustrating a configuration of a 3D audio data reception apparatus according to an embodiment.

FIG. 6 is a block diagram illustrating a configuration of a 3D audio data reception apparatus according to an embodiment.

In an embodiment, a decoder capable of reproducing VR or 3D audio content may include a 3D audio data decoding apparatus according to MPEG-H for which standardization has been completed in MPEG. The 3D audio data reception apparatus of FIG. 6 may represent the 3D audio data decoding apparatus according to MPEG-H. In one example, the 3D audio data decoding apparatus may be referred to as a 3D audio decoder, a 360 audio decoder, or a 360 audio decoding apparatus.

A bitstream may be generated by encoding and bit-packing an audio signal input from a transmission stage. In this case, the type of the audio signal may be a channel signal, an object signal, or a scene-based High-Order Ambisonics (HOA) signal, and a combination of the object signal and other signals may be input as the audio signal. For example, the channel signal and the object signal may be combined or the HOA signal and the object signal may be combined. At a reception stage, the bitstream may be input to the 3D audio data decoding apparatus according to MPEG-H so as to output decoded signals. The decoded signals may be output in order of signal types encoded at the transmission stage. When the object signal is included in the audio signal, object metadata information related to object information may also be output together when the decoded signals are output.

Next, the decoded signals are delivered to a rendering and mixing stage. The object metadata information output together with the decoded signals is delivered to a metadata and interface data processing stage that combines the object metadata information with externally and additionally input configurable information to alter characteristics of a final output signal. The externally and additionally configurable information may broadly include reproduction environment information and user interaction information. The reproduction environment information is information about a reproduction environment of audio that the user listens to. The user may selectively input the reproduction environment, i.e., a rendering type (a speaker or a headphone), use/non-use of head tracking (a tracking mode or scene displacement information), an external connection device (wire output setup), use/non-use of a screen (local screen size information), etc. The user interaction information is information that assigns user intention during audio reproduction. The user may apply, in real time, change (an interaction mode or interaction data information) in characteristics (position and size) of the object signal, a screen and object linkage function (zoom area information), etc. to a reproduction signal. For example, when the user desires to alter characteristic information of an arbitrary object during audio reproduction, it is necessary to modify received object metadata information to suit user intention in a corresponding process. Thus, the metadata and interface data processing stage not only sets the reproduction environment, but also modifies the object metadata with reference to externally input information (i.e., user interaction information). The rendering and mixing stage may represent a module for outputting the decoded signals according to the externally input reproduction environment information. In this case, a renderer may be determined according to the types of the decoded signals.

In one example, a channel converter may be used to render the channel signal. When the object signal is rendered, the channel signal may be input to an object renderer together with the object metadata. When an HOA type signal is rendered, an HOA renderer may be used. As such, the respective decoded signals may be input to renderers corresponding to respective audio types and may be reconfigured with reference to the reproduction environment information (speaker environment) so as to be output at the respective renderers. If the decoded signal is a combination of two types of signals, the rendered signals may be mixed to fit the position of an output speaker in a mixing process so as to output the channel signal. If a reproduction type is selected as a headphone, Binaural Room Impulse Responses (BRIRs) of both ears recorded at the speaker position in the reproduction environment are filtered in the rendered signals and added to the rendered signals to output final stereoscopic signals OutL and OutR. Since a large amount of computation is required when the BRIRs of both ears are directly filtered in the rendered signals, a parameterization process may be used as an optional tool. In the parameterization process, feature information of the BRIR may be extracted as parameters, and the extracted parameters may be directly applied to a signal. Among the externally input information, the tracking mode is information indicating whether a head tracking function is used. If the head tracking function is used, orientation information that changes every time the user moves the head may be generated in the scene displacement information. The metadata and interface processing stage may update existing orientation information with reference to the orientation information and render the decoded signals using the updated information. This allows the user to experience 3D audio using the tracking mode.

In FIG. 6, a dotted block of a lower part represents a module for modeling the BRIR. When the user changes the position thereof while using VR content (e.g., when moving from Scene A to Scene B in FIG. 5), the BRIR needs to be differently applied according to the position of the user like the case in which a scene of different feature information is applied according to the position of the user. A process in which the BRIR module models the BRIR with reference to the position information of the user and applies the BRIR to an audio signal is illustrated.

As described above, since the 3D audio data decoding apparatus according to MPEG-H basically supports the tracking mode, the orientation related information may be received and processed through a scene displacement syntax. However, in a 6DoF environment, it is necessary to receive not only the orientation information but also the position information. Tables 1 and 2 below define examples of a syntax for receiving the position information of the user.

TABLE 1

| Syntax | No. of bits | Mnemonics |
| --- | --- | --- |
| mpeg3daPosDisplacementData( ) { | | |
| sd_azimuth; | 8 | uimsbf |
| sd_elevation; | 6 | uimsbf |
| sd_distance; | 8 | uimsbf |
| } | | |

TABLE 2

| Syntax | No. of bits | Mnemonics |
| --- | --- | --- |
| mpeg3daPosDisplacementData( ) { | | |
| sd_x; | 8 | uimsbf |
| sd_y; | 8 | uimsbf |
| sd_z; | 8 | uimsbf |
| } | | |

Tables 1 and 2 may show a syntax of mpeg3daSceneDisplacementData. sd_azimuth represents user position change information for a scene based on azimuth. The azimuth may be represented as a value between −180 degrees and 180 degrees and may be calculated based on Az=1.5×(sd_azimuth−128); Az=min (max (Az, −180), 180).

sd_elevation represents user position change information for a scene based on an elevation angle. The elevation angle may be represented as a value between −90 and 90 degrees and may be calculated based on El=3×(sd_elevation−32); El=min (max (El, −90), 90).

sd_distance represents user position change information for a scene based on distance. The distance may be calculated based on Dist=distanceOffset+[10^(0.03225380*sd_distance)−1]; (distanceOffset=10 mm).

sd_x represents the user position change information for a scene based on the x-axis. sd_x is measured in meters and may be represented as a value between 0 and 167 km. sd_x may be calculated based on Dist_x=10^(0.03225380*sd_x)−1.

sd_y represents user position change information for a scene based on the y-axis. sd_y is measured in meters and may be represented as a value between 0 and 167 km. sd_y may be calculated based on Dist_y=10^(0.03225380*sd_y)−1.

sd_z represents user position change information for a scene based on the z-axis. sd_z is measured in meters and may be represented as a value between 0 and 167 km. ad_z may be calculated based on Dist_z=10^(0.03225380*sd_z)−1.

Both Table 1 and Table 2 show position information. In Table 1, the position information is represented as a spherical coordinate system and, in Table 2, the position information is represented as a Cartesian coordinate system. The receiver may support one of the spherical coordinate system and the Cartesian coordinate system or support both the spherical coordinate system and the Cartesian coordinate system. The 3D audio data decoder capable of receiving corresponding syntax information may render an audio signal with reference to changed position information of the user. The user may experience optimal 3D audio by listening to a signal rendered according to change in position information.

Figure 7A:
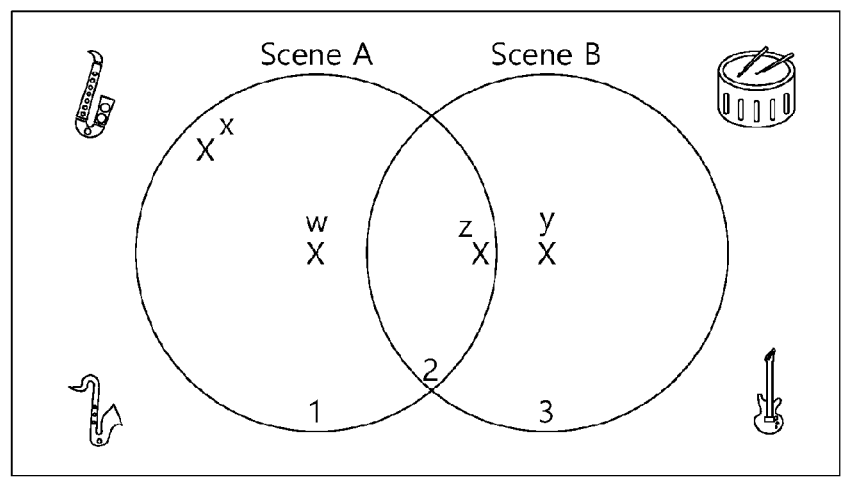
FIGS. 7A and 7B are diagrams illustrating an example of a virtual space and an actual space in which 3D audio content is reproduced.
Figure 7B:
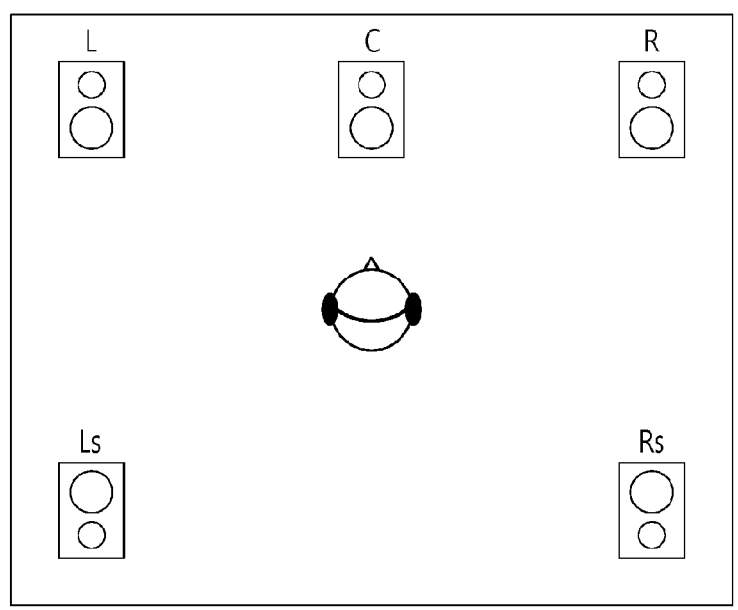

FIGS. 7A and 7B are diagrams illustrating an example of a virtual space and an actual space in which 3D audio content is reproduced.

A person of ordinary skill in the art will easily understand that, although a (virtual) space in which audio content is reproduced is represented in a 2D structure in FIGS. 7A and 7B, this is for convenience of explanation and the space may have a 3D structure.

FIG. 7A illustrates an example of a VR environment in which scenes are captured and FIG. 7B illustrates an example of a reproduction environment of a user (e.g., a 5-channel speaker environment). FIG. 7A illustrates in more detail the VR environment according to FIG. 5. Generally, when capturing scenes, it may be desirable in terms of performance to capture the scenes such that the scenes may be overlapped to ensure continuity of the scenes. However, if the scenes are captured to be overlapped, although a difference in performance may be perceived when using content in a 6DoF environment, a great difference in performance may not be recognized when the user moves the position thereof in a teleportation manner, i.e., in an instantaneously transitioning manner. In an embodiment of the present disclosure, a method of instantaneous transition will be described.

In FIG. 7A, it is assumed that the user is initially at an arbitrary position w of Scene A and may move by inputting desired position information to a receiver or an arbitrary device. Although the user may move anywhere in a VR space, the VR space broadly includes three areas: another region of Scene A (region 1), a region in which Scene A and Scene B are overlapped (region 2), and a region of Scene B (region 3). If the user moves from the initial position to another area of Scene A, scene information need not be changed. However, characteristics of a reproduced sound source may need to be changed according to the user position. For example, in FIG. 7A, when the user moves from the initial position w to x, the sound of a wind instrument should sound very close to the user. If the volume of a left speaker of FIG. 7B is intentionally changed to be remarkably large and the volume of a right speaker of FIG. 7B is changed to be small by calculating variation between an original position and a changed position, an effect similar to a desired effect may be obtained. If the user moves from Scene A to a point y of region 3, the reproduced scene may be changed and volume reproduced in a speaker may be changed according to the user position. If the user moves to region 2, an applied scene should be changed according to the user position. For example, if the user moves to a point z, although the point z is included in the range of Scene A, a point at which Scene B is captured is closer to the point z. In this case, reproduction of Scene B may be more suitable for the user.

In summary, a total of three pieces of information is needed as follows in order to support an environment in which a scene is displaced at the receiving end: (1) a desired position to be moved, (2) a scene corresponding to the desired position, and (3) a scene to be reproduced. A region that is capable of being covered by a previously captured scene may be configured, arbitrary points may be designated for each region, and then the above-proposed three pieces of information may be recorded for each point. Thereafter, when the user moves the position thereof while using arbitrary VR content, a point for which information is recorded, closest to the changed position may be selected and a scene corresponding to the selected point may be reproduced. As mentioned above, position change may be instantaneously made. In this case, when moving from an arbitrary position to another position, signaling may be performed so that the user may additionally experience a moving effect. The moving effect may be referred to as a transition effect but the name is not limited thereto. For example, the transition effect may be referred to as the transition effect. In an embodiment according to the present disclosure, the transition effect is defined such that three or more types of audio may be used, which will be described later.

Table 3 shows an example of a syntax that defines the above-proposed three pieces of information and characteristics of the transition effect. The syntax may be received by the 3D audio decoder so that an appropriate scene and the transition effect may be signaled. In the block diagram of FIG. 6, a part in which corresponding information is received is indicated by bold lines.

TABLE 3

| Syntax | No. of bits | Mnemonic |
|---|---|---|
| TransEffectInfo( ) | | |
| { | | |
|     numScenes; | 7 | uimsbf |
|     for ( scn=0; scn < numScenes; scn++ ) { | | |
|         Scene_idx[scn]; | 10 | uimsbf |
|         numTransEffectPos[scn]; | 7 | uimsbf |
|         for ( pos=0; pos < numTransEffectPos[scn]; pos++ ) { | | |
|             TranPos_idx[scn][pos]; | 10 | uimsbf |
|             TranPos_azimuth[scn][pos]; | 8 | uimsbf |
|             TranPos_elevation[scn][pos]; | 6 | uimsbf |
|             TranPos_distance[scn][pos]; | 8 | uimsbf |
|             TransScene_idx[scn][pos]; | 10 | uimsbf |
|             TransEffectType[scn][pos]; | 4 | uimsbf |
|             TransEffectAudioType[scn][pos]; | 4 | uimsbf |
|             TransEffectAudioHasGain[scn][pos]; | 1 | bslbf |
|             if ( TransEffectAudioHasGain[scn][pos] ) { | | |
|                 TransEffectAudio_gain[scn][pos]; | 7 | uimsbf |
|             } | | |
|         } | | |
|     } | | |
| } | | |

In Table 3, numScenes represents the total number of scenes. Scene_idx defines a unique ID value of each scene to identify a plurality of scenes. The Scene_idx value may start from 0. numTransEffectPos represents the total number of transition positions defined for each scene. TranPos_idx defines a unique ID value of each transition position to identify a plurality of transition positions. The TranPos_idx value may start from 0.

TranPos_azimuth represents position information of a transition position in terms of azimuth. The angle value may be between Azimuth=−180 degrees and Azimuth=180 degrees and may be calculated based on AzPos=1.5×(TranPos_azimuth−128); AzPos=min (max (AzPos, −180), 180).

TranPos_elevation represents position information of a transition position as an angle value in terms of an elevation angle. The angle value may be between Elevation=−90 degrees and Elevation=90 degrees and may be calculated based on ElPos=3×(TranPos_elevation−32); ElPos=min (max (ElPos, −90), 90).

TranPos_distance represents position information of a transition position in terms of distance in meters. The distance value is given between 0.01 m and 167 km and may be calculated based on DistPos=distanceOffset+[10^(0.03225380*TranPos_distance)−1]; (distanceOffset=10 mm).

TransScene_idx defines a scene that should be reproduced at a transition position. Depending on a defined position, the scene that should be reproduced at the transition position may or may not match a current scene.

TransEffectType defines the type of a transition effect. The type of the transition effect is shown in Table 4 below, for example.

TABLE 4

| TransEffectType | Value |
|---|---|
| UNDEFINED | 0 |
| FADEIN_FADEOUT | 1 |
| DOPPLER | 2 |
| REVERBERATION | 3 |
| BINAURAL_RENDERING | 4 |
| /* reserved for ISO use */ | 5-16 |

TransEffectType may include a FADEIN_FADEOUT type, a DOPPLER type, a REVERBERATION type, and a BINAURAL_RENDERING type and may include various other types.

TransEffectAudioType defines the type of an audio signal to be used in the transition effect. TransEffectAudioType is shown in Table 5 below, for example.

TABLE 5

| TransEffectAudioType | Value |
|---|---|
| UNDEFINED | 0 |
| NATURAL SOUND | 1 |
| SYNTHETIC SOUND | 2 |
| SPOKEN_TEXT (GUIDE) | 3 |
| SPOKEN_TEXT (INFORMATION) | 4 |
| SPOKEN_TEXT (DIRECTION) | 5 |
| /* reserved for ISO use */ | 6-15 |

In Table 5, NATURAL SOUND represents audio recorded in an actual environment and SYNTHETIC SOUND represents audio synthesized by a sound engineer. SPOKEN_TEXT basically represents voice but may be further subdivided according to purpose. SPOKEN_TEXT (GUIDE) represents audio describing a scene or scene-related information used at a transition position (e.g., audio saying "You are transitioning to Scene 2" may be considered). SPOKEN_TEXT (INFORMATION) represents basic information about the transition position, and SPOKEN_TEXT (DIRECTION) represents audio describing a direction in which the transition position is located centering on a current scene.

Referring back to Table 3, TransEffectAudioHasGain represents whether transition effect audio has a gain value. TransEffectAudio_gain defines a gain value of transition effect audio.

The user may change audio scene information even in a process in which audio content is reproduced. The 3D audio decoder may also change characteristics of elements (a channel, an object, or an HOA type signal) constituting a scene through ElementInteractionData0. Since a corresponding payload is used for the purpose of interaction between the user of the reception stage and audio content, the reception stage may generate, when necessary, related information and input the information to the encoder. The transition effect generally occurs in the process of using arbitrary audio content. That is, position change (or transition) information desired by the user may be included in elementInteractionData( ) and make a request for the position change information to the receiver. Table 6 shows an ElementInteractionData( ) syntax including transition effect information.

TABLE 6

| Syntax | No. of bits | Mnemonic |
|---|---|---|
| ElementInteractionData() | | |
| { | | |
| ei_interactionMode; | 1 | Bslbf |
| ei_numGroups; /* Channel, Object, HOA, SAOC */ | 7 | uimsbf |
| if( ei_interactionMode ==0){ | | |
|     ei_GroupInteractivityStatus(ei_numGroups); | | |
| } else { | | |
|     ei_groupPresetID; | 5 | uimsbf |
|     ei_GroupInteractivityStatus(ei_numGroups); | | |
| } | | |
| isTransEffectOn; | 1 | bslbf |
| if(isTransEffectOn){ | | |
|     Scene_idx; | 7 | uimsbf |
|     if(isDefinedTransPosUsed){ | 1 | bslbf |
|         TransPos_idx; | 7 | uimsbf |
|     } else { | | |
|         TransPos_azimuth; | 8 | uimsbf |
|         TransPos_elevation; | 6 | uimsbf |
|         TransPos_distance; | 8 | uimsbf |
|     } | | |
| } | | |
| } | | | isTransEffectOn represents whether the transition effect is used (or whether transition is performed). Scene_idx represents an ID value corresponding to a scene selected by the user. isDefinedTranPosUsed represents whether pre-defined position information is used. TransPos_idx represents an ID value corresponding to a predefined position. TranPos_azimuth represents position information of a transition position selected by the user as an angle value in terms of azimuth. The corresponding angle information may be calculated based on a scene included in the transition position. The angle value is given between Azimuth=−180 degrees and Azimuth=180 degrees and may be calculated based on AzPos=1.5×(Pos_azimuth−128); AzPos=min (max (AzPos, −180), 180).

TranPos_elevation represents the position information of the transition position selected by the user as an angle value in terms of an elevation angle. The corresponding angle information may be calculated based on a scene included in the transition position. The angle value is given between Elevation=−90 degrees and Elevation=90 degrees and may be calculated based on ElPos=3×(Pos_elevation−32); ElPos=min (max (#lPos, −90), 90).

TranPos_distance represents the position information of the transition position in terms of distance in meters. The distance value is given between 0.01 m and 167 km. The corresponding distance information may be calculated based on a scene to which the transition position belongs and may be calculated based on TranPos_distance=distanceOffset+ [10^ (0.03225380*Pos_distance)−1]; (distanceOffset=10 mm).

In Table 6, the transition effect information added from the existing ElementInteractionData syntax is indicated by a dotted area. The user may first determine a scene when determining the transition position. Next, whether to move to a position predefined for each scene or to a position determined by the user may be determined. The values of Scene_idx and TransScene_idx in Table 6 may correspond to Scene_idx[scn] and TransScene_idx[scn][pos], respectively, defined in Table 3.

Content defined in Table 3 shows the case in which only one transition effect is defined for each transition position of each scene. When transition of a scene occurs, only information defined in TransEffectInfo( ) may be applied to the user. If a plurality of transition effects is defined for each transition position of each scene, when the transition effect occurs, the user may select the type of the transition effect. First, an example of a syntax of TrasEffectInfo( ) defining a plurality of transition effects for each transition position is shown in Table 7 below.

TABLE 7

| Syntax | No. of bits | Mnemonic |
|---|---|---|
| TransEffectInfo( ) | | |
| { | | |
|   numScenes; | 7 | uimsbf |
|   for ( scn=0; scn < numScenes; scn++ ) { | | |
|     Scene_idx[scn]; | | |
|     numTransEffectPos[scn]; | 10 | uimsbf |
|     for ( pos=0; pos < numTransEffectPos[scn]; pos++ ) { | | |
|       Pos_idx[scn][pos]; | 10 | uimsbf |
|       Pos_azimuth[scn][pos]; | | |
|       Pos_elevation[scn][pos]; | | |
|       Pos_distance[scn][pos]; | | |
|       TransScene_idx[scn][pos]; | 4 | uimsbf |
|       numTransEffectAudio[scn][pos]; | 4 | uimsbf |
|       for ( num=0; num<numTransEffectAudio[scn][pos]; num++ ) { | 1 | |
|         TransEffectAudio_idx[scn][pos][num]; | | |
|         TransEffectType[scn][pos][num]; | 7 | uimsbf |
|         TransEffectAudioType[scn][pos][num]; | | |
|         TransEffectAudioHasGain[scn][pos][num]; | | |
|         if ( TransEffectAudioHasGain[scn][pos][num] ) { | | |
|           TransEffectAudio_gain[scn][pos][num]; | | |
|         } | | |
| } | | |

Table 7 is almost similar to Table 3. However, table 7 defines a plurality of transition effect audios for a single scene. Therefore, an index for identifying a plurality of transition effects is additionally defined.

TransEffectAudio_idx defines a unique ID value for each transition effect in order to identify a plurality of transition effects. The TransEffectAudio_idx value may start from 0.

ElementInteractionData( ) in Table 7 may be the same as that in Table 8 below. To minimize redundancy, Table 8 shows only a syntax related to the transition effect.

TABLE 8

| Syntax | No. of bits | Mnemonic |
|---|---|---|
| ElementInteractionData( ) | | |
| { | | |
| .... | | |
|     isTransEffectOn; | 1 | bslbf |
|     if (isTransEffectOn) { | | |
|         Scene_idx; | 7 | uimsbf |
|         if (TranPosDefined) { | 1 | bslbf |
|             TransScene_idx; | 7 | uimsbf |
|         } else { | | |
|             TranPos_azimuth; | 8 | uimsbf |
|             TranPos_elevation; | 6 | uimsbf |
|             TranPos_distance; | 8 | uimsbf |
|         } | | |
|         TransEffectType; | 4 | uimsbf |
|         TransEffectAudioType; | 4 | uimsbf |
|     } | | |
| } | | |

TransEffectType represents selection for the type of the transition effect. The type of the transition effect conforms to Table 4 above. TransEffectAudioType represents selection for the type of transition effect audio. The type of transition effect audio conforms to Table 5 above.

As shown in Table 8, as the user may directly select the type of the transition effect, TransEffectType and TransEffectAudioType are additionally defined in a syntax for receiving user information. The added information is information that selects characteristics of a sound source generated when transition is performed. If the transition effect selected by the user is not defined in a TransEffectInfo( ) payload, the receiver may regard and process both TransEffectType and TrasEffectAudioType as UNDEFINED (TransEffectType=0 and TransEffectAudioType)=0).

Figure 8:
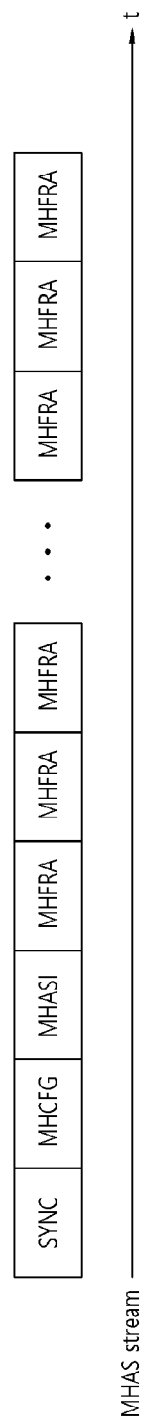

FIG. 8 is a diagram illustrating an example of a 3D audio stream.

One embodiment relates to how a transition effect is received and used by the 3D audio decoder. Audio-related configuration information and a stream based on 3D audio may be configured in a packet form at the transmission stage and then generated as a stream. The generated stream may be transmitted to the reception stage. Each packet may be composed of a packet type, a label for identifying various packet types, and a payload including various information. FIG. 8 shows an example of a simply configured 3D audio stream.

In FIG. 8, SYNC, MHCFG, MHASC, and MHFRM represent PACTYP_SYNC, PACTYP_MPEGH3DACFG, PACTYP_AUDIOSCENEINFO, and PACTYP_MPEGH3DAFRAME, respectively. PACTYP_SYNC is a packet used for transmission through a channel incapable of using frame synchronization. PACTYP_MPEGH3DACFG is information including decoding configuration and may be required when an audio stream is decoded. When the packet is received, an mpegh3daconfig( ) function may be retrieved. PACTYP_AUDIOSCENEINFO is a packet in which audio scene information is defined. This packet is transmitted only when an audio scene is defined and may be located after PACTYP_MPEGH3DACFG. When the corresponding packet is received, an mae_AudioSceneInfo( ) function may be retrieved. PACTYP_MPEGH3DAFRAME may include all audio stream information and may be retrieved through an mpeg3daframe( ) function. Therefore, in a decoding order according to the exemplary embodiment of FIG. 8, a decoding configuration is set first and defined audio scene information is received. Next, mpeg3daframe( ) is retrieved in every frame to decode and render the audio stream. Tables 9 and 10 show some packets in addition to the aforementioned packets. In one example, Tables 9 and 10 show update of tables according to the MPEG-H 3D audio specification.

TABLE 9

| Syntax | No. of bits | Mnemonic |
|---|---|---|
| MHASPacketPayload(MHASPacketType) | | |
| { | | |
|   switch(MHASPacketType){ | | |
|     case PACTYP_SYNC: | | |
|       0xA5; /* syncword*/ | 8 | uimsbf |
|       break; | | |
|     case PACTYP_MPEGH3DACFG: | | |
|       mpegh3daConfig( ); | | |
|       break; | | |
|     case PACTYP_MPEGH3DAFRAME: | | |
|       mpegh3daFrame( ); | | |
|       break; | | |
|     case PACTYP_AUDIOSCENEINFO: | | |
|       mae_AudioSceneInfo( ); | | |
|       break; | | |
|     case PACTYP_FILLDATA: | | |
|       for(i=0; i<MHASPacketLength; i++){ | | |
|         mhas_fill_data_byte(i); | 8 | bslbf |
|       } | | |
|       break; | | |
|     case PACTYP_SYNCGAP: | | |
|       syncSpacingLength = escapedValue(16, 24, 24); | 16, 40, 64 | uimsbf |
|       break; | | |
|     ... . | | |
|     ... . | | |
|     ... . | | |
|     case PACTYP_AUDIOTRUNCATION: | | |
|       audioTruncationInfo( ); | | |
|       break; | | |
|     case PACTYP_GENDATA: | | |
|       GenDataPayload( ); | | |
|       break; | | |
|     case PACTYP_EARCON: | | |
|       EarconInfo( ); | | |
|       break; | | |
|     case PACTYP_TRANSEFFECT: | | |
|       TranEffectInfo( ); | | |
|       break( ); | | |
|   } | | |
|   ByteAlign( ); | | |
| } | | |

TABLE 10

| MHASPacketType | Value |
|---|---|
| PACTYP_FILLDATA | 0 |
| PACTYP_MPEGH3DACFG | 1 |
| PACTYP_MPEGH3DAFRAME | 2 |
| PACTYP_AUDIOSCENEINFO | 3 |
| /* reserved for ISO use */ | 4-5 |
| PACTYP_SYNC | 6 |
| PACTYP_SYNCGAP | 7 |
| ... | ... |
| ... | ... |
| PACTYP_AUDIOTRUNCATION | 17 |
| PACTYP_GENDATA | 18 |
| PACTYP_EARCON | 19 |
| PACTYP_TRANEFFECT | 20 |

TABLE 10-continued

| MHASPacketType | Value |
| --- | --- |
| /* reserved for ISO use */ | 21-127 |
| /* reserved for use outside of ISO scope */ | 128-261 |
| /* reserved for ISO use */ | 262-389 |
| /* reserved for use outside of ISO scope */ | 390-517 |

NOTE:
Application-specific MHASPacketType values are mandated to be in the space reserved for use outside of ISO scope. These are skipped by a decoder as a minimum of structure is required by the decoder to skip these extensions.

Figure 9:
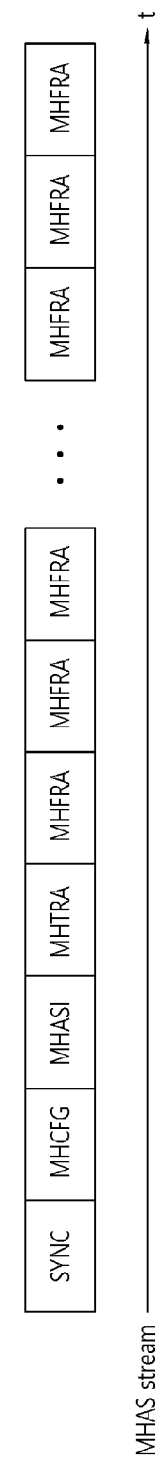
FIG. 9 is a diagram illustrating an example of a 3D audio stream.

FIG. 9 is a diagram illustrating another example of a 3D audio stream.

In an embodiment, FIG. 9 may illustrate the case in which only a packet related to a transition effect is added to an existing bitstream.

In FIG. 9, MHTRA may represent a packet related to a transition effect and information about the packet related to the transition effect is shown in dotted lines of Table 9. Referring to FIG. 9, it may be appreciated that the MHTRA packet is retrieved before an MHFRA packet is retrieved. In addition, transition effect related audio streams associated with MHTRA may be included in the MHFRA packet together with an audio stream, so that the transmission effect related audio streams may be simultaneously decoded when audio signals are decoded or may be decoded when there is signaling indicating that the transition effect is used.

A process of using the transition effect in the 3D audio decoder described above is illustrated in more detail in FIGS. 10A and 10B below.

Figure 10A:
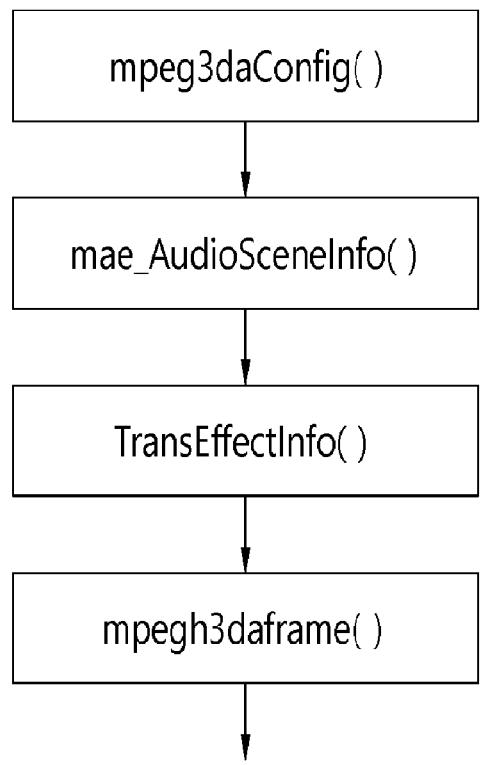
FIGS. 10A and 10B are flowcharts illustrating a process of processing a 3D audio stream in a 3D audio data reception apparatus according to an embodiment.
Figure 10B:
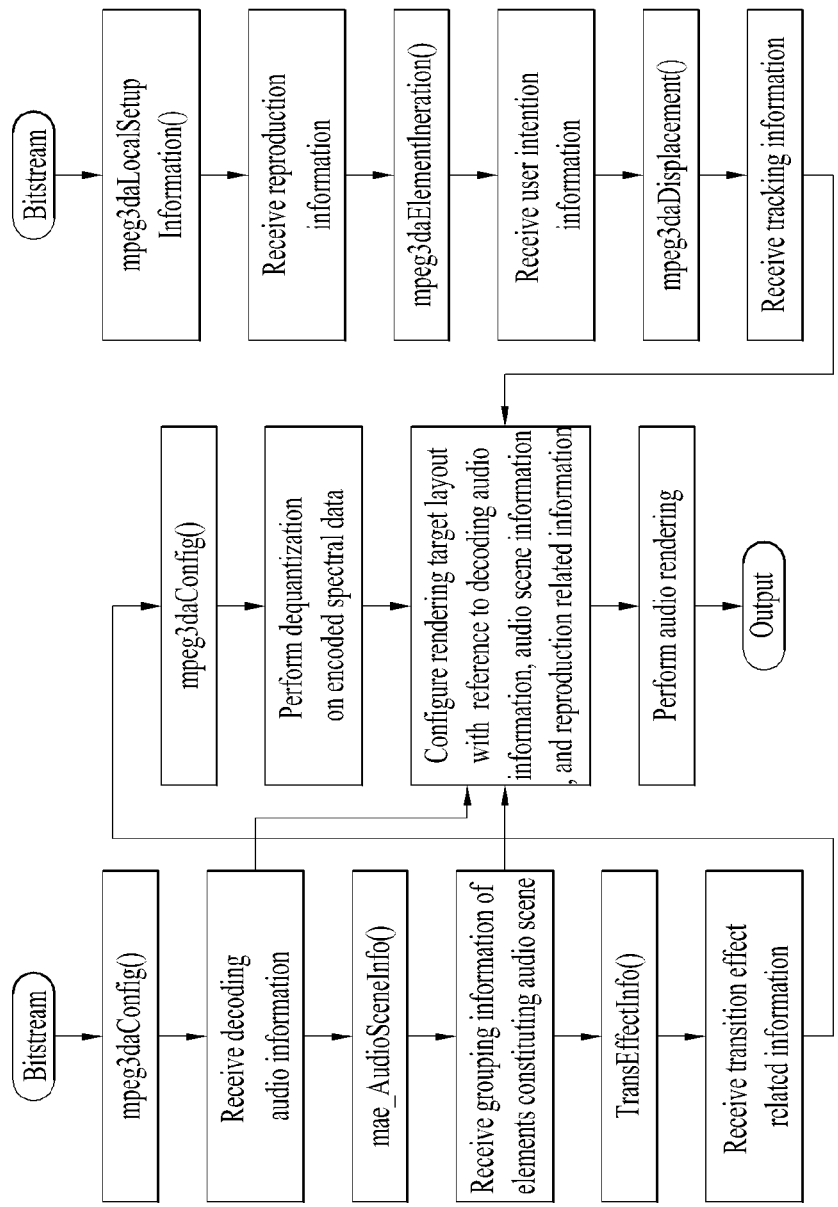

FIGS. 10A and 10B are flowcharts illustrating a process of processing a 3D audio stream in a 3D audio data reception apparatus according to an embodiment.

FIG. 10A schematically illustrates a flow of calling a bitstream according to FIG. 9. A more detailed call and operation process (including input information of the reception stage) for FIG. 10A is illustrated in FIG. 10B. First, if a bitstream is received, a payload required to perform decoding configuration for an audio signal may be received by calling mpeg3daConfig( ). Next, if an audio scene is defined (if an audio scene related packet (MHASI) is received), payloads of elements constituting the audio scene may be received by calling maeAudioSceneInfo( ). If no audio scene is defined, the next step may be performed. Thereafter, if there is transition effect information (if a transition effect related packet (MHTRA) is received), a transition effect related payload may be received by calling TransEffectInfo( ). Likewise, if no transition effect is defined, the next step may be performed. After all of the above information is received, mpeg3daframe( ) is called, and all compressed audio signals are dequantized and decoded. In this process, not only an existing audio signal but also transition effect audio related signals may be decoded together.

Meanwhile, separately input information at the reception stage is also input to the receiver. mpeg3daLocalSetupInformation( ) representing reproduction environment information of the reception stage may be input to the receiver, mpeg3daElementInteraction( ) representing feature information of an audio scene changed by the user (including transition change information of the user) may be input to the receiver, and mpeg3daDisplacment( ) representing tracking information of the user may be input to the receiver. mpeg3daElementInteraction( ) and mpeg3daDisplacement( ) may be continuously received even during reproduction of audio content. Next, the receiver may analyze the received information to configure an output channel environment and apply the analyzed information of the reception stage to a decoded audio signal to render audio signals according to the output channel environment. If a transition request occurs during reproduction of audio content, i.e., if a scene is displaced, transition effect audio may be inserted between an existing reproduced scene and a scene to be displaced with reference to transition effect related information defined as part of the payload of mpeg3daElementInteraction( ) so that reproduction may be performed. That is, after transition effect audio is reproduced before the scene to be displaced is reproduced, the scene to be displaced may be reproduced.

Referring to the processes described with reference to FIGS. 10A and 10B, it may be appreciated that not only an audio signal but also an audio signal for a transition effect is compressed together and stored in a packet to generate a bitstream. This means that decoding should be performed first when the transition effect audio signal is used in the receiver, so that additional calculation may be required. Generally, since a reproduction time of the transition effect audio signal is greatly shorter than that of a general audio signal, a separate packet for an uncompressed transition effect audio signal, i.e., a Pulse-Code modulation (PCM) audio signal, may be newly defined and included in the bitstream. In one example, an MPEG audio subgroup proposes a method of packetizing an earcon PCM signal representing an object type of audio having a short reproduction time, such as transition effect audio, and storing the packetized signal in the bitstream. An embodiment of the present disclosure additionally proposes a method of supporting a transition effect audio PCM signal like the existing proposed earcon PCM signal. Table 5 has been updated as shown in Table 11 to signal that the transition effect audio signal is the PCM signal.

TABLE 11

| TransEffectAudioType | Value |
| --- | --- |
| ... | ... |
| SPOKEN_TEXT (DIRECTION) | 5 |
| TRANSITION EFFECT AUDIO PCM | 6 |
| /* reserved for ISO use */ | 7-15 |

Next, there may be two methods of supporting the transition effect audio PCM signal in the 3D audio decoder. The first method is a method of adding information related to the transition effect audio PCM signal to a payload syntax of a packet supporting the existing earcon PCM signal, and examples of a detailed syntax are shown in Tables 12 to 15 below.

TABLE 12

| Syntax | No. of bits | Mnemonic |
| --- | --- | --- |

```
MHASPacketPayload(MHASPacketType)
{
  switch(MHASPacketType){
    ...      .
    ...      .
    ...      .
    case PACTYP_EARCON:
      EarconInfo( );
      break( );
    case PACTYP_TRANSEFFECT:
      TranEffecInfo( );
      break( );
    case PACTYP_PCMCONFIG:
      pcmDataConfig( );
```

TABLE 12-continued

| Syntax | No. of bits | Mnemonic |
|---|---|---|
|     break;<br>  case PACTYP_PCMDATA:<br>    pcmDataPayload( );<br>    break;<br>  }<br>  ByteAlign( );<br>} | | |

TABLE 13

| MHASPacketType | Value |
|---|---|
| ... | ... |
| PACTYP_EARCON | 19 |
| PACTYP_TRANEFFECT | 20 |
| PACTYP_PCMCONFIG | 21 |
| PACTYP_PCMDATA | 22 |
| /* reserved for ISO use */ | 23-127 |
| /* reserved for use outside of ISO scope */ | 128-261 |
| /* reserved for ISO use */ | 262-389 |
| /* reserved for use outside of ISO scope */ | 390-517 |

NOTE:
Application-specific MHASPacketType values are mandated to be in the space reserved for use outside of ISO scope. These are skipped by a decoder as a minimum of structure is required by the decoder to skip these extensions.

Dotted areas in Tables 12 and 13 represent newly defined packets in order to support the PCM signal. Tables 14 and 15 show a detailed syntax for the newly defined packets. The dotted areas represent newly added information as compared with the existing syntax.

TABLE 14

| Syntax | No. of bits | Mnemonic |
|---|---|---|
| pcmDataConfig<br>{ | 0 | |
|   numPcmSignals; | 7 | uimsbf |
|   numTransEffectAudioPcmSignals; | 7 | uimsbf |
|   pcmSamplingRateIndex; | 5 | bslbf |
|   if(pcmSamplinRateIndex == 0x1f) {<br>    pcmSamplingRate; | 24 | uimsbf |
|   } | | |
|   pcmBitsPerSample; | 5 | uimsbf |
|   pcmFrameSizeIndex; | 3 | uimsbf |
|   if (pcmFrameSizeIndex == 5) {<br>    pcmFixFrameSize; | 16 | uimsbf |
|   } | | |
|   for (i=0; i < numPcmSignals; i++) { | | |
|     pcmSignal_ID; | 7 | uimsbf |
|     isTransEffectAudioPcmSignal; | 1 | bslbf |
|     bsPcmLoudnessValue[i]; | 8 | uimsbf |
|     bsPcmAttenuationGain[i]; | 8 | uimsbf |
|   }<br>} | | |

TABLE 15

| Syntax | No. of bits | Mnemonic |
|---|---|---|
| pcmDataPayload( )<br>{ | | |
|   interleavedData; | 1 | bslbf |
|   numPcmSignalsInFrame; | 7 | uimsbf |
|   numTranEffectAudioSignalsInFrame; | 7 | uimsbf |
|   for (i=0; i +21 numPcmSignalsInFrame; i++) {<br>    pcmSignal_ID; | 7 | uimsbf |
|   } | | |
|   if(pcmFrameSizeIndex == 6) {<br>    pcmVarFrameSize; | 16 | uimsbf |
|   } | | |
|   pcmDataChunk; /*NOTE*/<br>} | nBits | uimsbf |

NOTE: nBits = numPcmSignalsInFrame*earconFrameSize*earconBitsPerSample numPcmSignals represents the total number of PCM signals included in pcmDataPayload( ) numTransEffectAudioPcmSignals represents the total number of transition effect audio PCM signals included in pcmDataPlayload( ) Therefore, the difference between numTransEffectAudioPcmSignals and numPcmSignals is the total number of earcon PCM signals. pcmSamplingRateIndex represents an index for determining the sampling rate of the PCM signal. In one example, the index may follow a table defined in an existing specification. If pcmSamplingRate: pcmSamplingRateIndex is 0, the sampling rate of the PCM signal may be designated as an unsigned integer value. pcmBitsPerSample represents the number of bits per sample of the PCM signal. The number of bits should be at least 4. pcmFrameSizeIndex may represent an index for determining the frame size of the PCM signal. The index is shown in Table 16 below, for example.

TABLE 16

| pcmFrameSizeIndex | pcmFrameSize |
|---|---|
| 0 | outputFrameLength as defined in ISO/IEC 23003-3 |
| 1 | 768 |
| 2 | 1024 |
| 3 | 2048 |
| 4 | 4096 |
| 5 | fixed frame size given by pcmFixFrameSize |
| 6 | variable frame size given by pcmVarFrameSize |
| 7 | reserved | pcmFixFrameSize represents a fixed frame size of a PCM signal. pcmSignal_ID represents an ID assigned to each signal to identify each PCM signal. isTransEffectAudioPcmSignal represents whether the corresponding PCM signal is a transition effect audio signal. bsPcmLoudnessValue represents the loudness value of the PCM signal. bsPcmAttenuationGain represents an attenuation gain value applied to another audio signal activated together when the PCM signal is reproduced. In regard to interleavedData, interleavedData=1 represents that an audio signal is interleaved, and interleavedData=0 represents that the audio signal is not interleaved.

numPcmSignalsInFrame represents the number of PCM audio signals delivered from pcmDataPayload( ). numTranEffectAudioSignalsInFrame represents the number of transition effect audio PCM signals among PCM audio signals delivered from pcmDataPayload( ) pcmSignal_ID represents an ID for identifying PCM signals. pcmVarFrameSize represents a variable frame size of a PCM signal. If interleavedData=1, pcmDataChunk is calculated as numPcmSignalsInFrame*pcmFrameSize*pcmBitsPerSample. Otherwise, pcmDataChunk represents numPcmSignalsInFrame frames having a size of pcmFrameSize*pcmBitsPerSample.

The second method of supporting the transition effect audio PCM signal in the 3D audio decoder is a method of newly defining a dedicated packet for receiving the transition effect audio PCM signal. However, this packet only differs in characteristics of the audio signal and may be similar to information required when the above-mentioned earcon signal is received. Therefore, in an embodiment of the present disclosure, the contents of a syntax are used almost similarly. Examples of definition of a related syntax are shown in Tables 17 to 20 below.

TABLE 17

| Syntax |
| --- |
| MHASPacketPayload(MHASPacketType)<br>{<br>    switch (MHASPacketType) {<br>        ... .<br>        ... .<br>        ... .<br>        case PACTYP_TRANSEFFECT:<br>            TranEffectInfo( );<br>            break( );<br>        case PACTYP_TRANSEFFECTPCMCONFIG:<br>            TranEffectAudiopcmDataConfig( );<br>            break;<br>        case PACTYP_TRANSEFFECTPCMDATA:<br>            TranEffectAudiopcmDataPayload( );<br>            break;<br>    }<br>} |

TABLE 17-continued

| Syntax |
| --- |
|     ByteAlign( );<br>} |

TABLE 18

| MHASPacketType | Value |
| --- | --- |
| ... | ... |
| PACTYP_TRANEFFECT | 20 |
| PACTYP_PCMCONFIG | 21 |
| PACTYP_PCMDATA | 22 |
| PACTYP_TRANEFFECTPCMCONFIG | 23 |
| PACTYP_TRANEFFECTPCMDATA | 24 |
| /* reserved for ISO use */ | 23-127 |
| /* reserved for use outside of ISO scope */ | 128-261 |
| /* reserved for ISO use */ | 262-389 |
| /* reserved for use outside of ISO scope */ | 390-517 |

NOTE:
Application-specific MHASPacketType values are mandated to be in the space reserved for use outside of ISO scope. These are skipped by a decoder as a minimum of structure is required by the decoder to skip these extensions.

TABLE 19

| Syntax | No. of bits | Mnemonic |
| --- | --- | --- |
| TranEffectAudiopcmDataConfig ( )<br>{ | | |
|     numTranEffectAudioPcmSignals; | 7 | uimsbf |
|     TranEffectAudioSamplingRateIndex; | 5 | bslbf |
|     if (earconSamplinRateIndex == 0x1f) { | | |
|         TranEffectAudioSamplingRate; | 24 | uimsbf |
|     } | | |
|     TranEffectAudiopcmBitsPerSample; | 5 | uimsbf |
|     TranEffectAudiopcmFrameSizeIndex; | 3 | uimsbf |
|     if (TranEffectAdudiopcmFrameSizeIndex == 5) { | | |
|         TranEffectAudiopcmFixFrameSize; | 16 | uimsbf |
|     } | | |
|     for ( i=0; i< numTranEffectAdudioPcmSignals; i++ ) { | | |
|         TranEffectAudiopcmSignal_ID; | 7 | uimsbf |
|         bsTranEffectAudioPcmLoudnessValue[i]; | 8 | uimsbf |
|         bsTranEffectAudioPcmAttenuationGain[i]; | 8 | uimsbf |
|     }<br>} | | |

TABLE 20

| Syntax | No. of bits | Mnemonic |
| --- | --- | --- |
| TranEffectAudiopcmDataPayload ( )<br>{ | | |
|     interleavedData; | 1 | bslbf |
|     numTranEffectAudioPcmSignalsInFrame; | 7 | uimsbf |
|     for ( i=0; i< numTranEffectPcmSignalsInFrame; i++ ) { | | |
|         TranEffectAudiopcmSignal_ID; | 7 | uimsbf |
|     } | | |
|     if ( earconFrameSizeIndex == 6 ) { | | |
|         TranEffectAudioVarFrameSize; | 16 | uimsbf |
|     } | | |
|     TranEffectAudiopcmDataChunk;    /* NOTE */ | nBits | uimsbf |
| } | | |

NOTE:
nBits = numPcmSignalsInFrame * earconFrameSize * earconBitsPerSample numTranEffectAudioPcmSignals represents the total number of transition effect audio PCM signals included in TranEffectAudiopcmDataPayload( ) TranEffectAudioSamplingRateIndex represents an index for determining the sampling rate of a transition effect audio PCM signal. In one example, the index may follow a table defined in an existing specification. When pcmSamplingRateIndex is 0, TranEffectAudioSamplingRate may designate the sampling rate of the transition effect audio PCM signal as an unsigned integer value. TranEffectAudiopcmBitsPerSample represents the number of bits per sample of the transition effect audio PCM signal. The number of bits should be at least 4. TranEffectAudiopcmFrameSizeIndex represents an index for determining the frame size of the transition effect audio PCM signal. In one example, the index may follow Table 16. TranEffectAudiopcmFixFrameSize represents a fixed frame size of the transition effect audio PCM signal. TranEffectAudiopcmSignal_ID represents an ID assigned to each signal to identify each transition effect audio PCM signal. bsTranEffectAudioPcmLoudnessValue represents the loudness value of the transition effect audio PCM signal.

bsTranEffectAudioPcmAttenuationGain represents an attenuation gain value applied to another audio signal that is activated together when the transition effect audio PCM signal is reproduced. In regard to interleavedData, interleavedData=1 represents that the transition effect audio signal is interleaved, and interleavedData=0 represents that the transition effect audio signal is not interleaved. numTranEffectAudioPcmSignalsInFrame represents the number of PCM audio signals delivered from TranEffectAudiopcmDataPayload( ). TranEffectAudiopcmSignal_ID represents an ID for identifying transition effect audio PCM signals. TranEffectAudioVarFrameSize represents a variable frame size of the transition effect audio PCM signal. If interleavedData=1, TranEffectAudiopcmDataChunk is calculated as numPcmSignalsInFrame*pcmFrameSize*pcmBitsPerSample and, otherwise, TranEffectAudiopcmDataChunk may represent numPcmSignalsInFrame frames having a size of pcmFrameSize*pcmBitsPerSample.

In one embodiment, technology for changing a scene while the user experiences arbitrary VR content may allow the user to be more immersed in the corresponding content. The technology may correspond to standard requirements. In addition, since a sound effect of audio used as a transition effect may be used to transmit not only sound with stereoscopic and spatial characteristics but also feature information about a changed position, the user may more effectively use arbitrary VR content.

Figure 11:
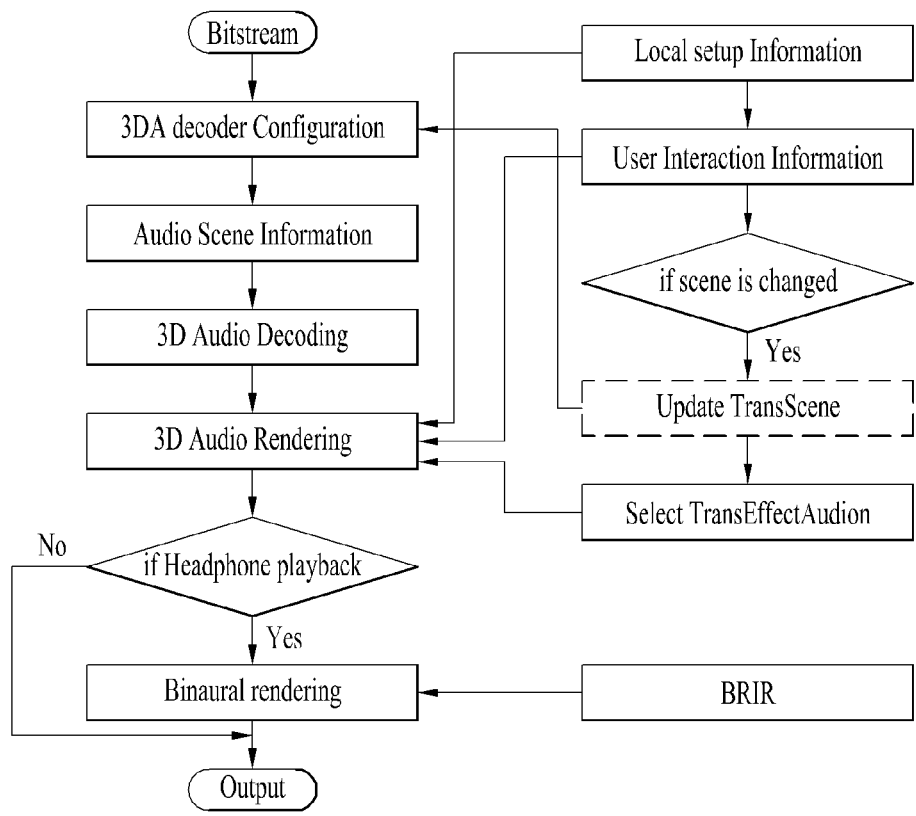
FIG. 11 is a flowchart illustrating an operation method of a 3D audio data reception apparatus according to an embodiment.

FIG. 11 is a flowchart illustrating an operation method of a 3D audio data reception apparatus according to an embodiment.

In an embodiment, the operation method of the 3D audio data reception apparatus may include 9 steps as follows.

In the first step, when a bitstream is received, a 3DA decoder configuration stage may extract decoding audio related information. That is, the 3DA decoder configuration stage may read basic information, such as information about the number of channels of encoded audio signals, information about the number of objects, and a sampling rate, from the received bitstream.

In the second step, if there is audio scene information, grouping information of elements constituting an audio scene may be extracted.

In the third step, decoding may be performed on the encoded audio signals. In this process, channels, objects, and HOA-type signals may be decoded as many times as the number of audio channels without separate distinguishment therebetween.

In the fourth step, reproduction environment information of a reception stage may be configured. That is, the reception stage may determine through which reproducing device (speaker or headphone) audio content will be reproduced, or whether a reproduction environment is a stereoscopic speaker environment or a multi-channel speaker environment when audio content is reproduced.

In the fifth step, when the user interacts with the audio content (when the user desires to change characteristics of an arbitrary object reproduced in audio content), related information may be recorded together with the reproduction environment information.

In the sixth step, if the position of the user is changed or the user desires to change the position thereof, scene information (TransScene) to be updated is recorded and, at the same time, a transition effect audio type may be selected.

In the seventh step, when the scene is changed, decoding may be performed by resetting audio configuration information and audio scene information, corresponding to the scene.

In the eighth step, decoded audio signals may be reconfigured with reference to speaker layout information configured in the fourth step so that the audio scene may be appropriately reproduced. and a rendered signal may be output.

In the ninth step, if the reproduction device is a headphone, a binaural rendered signal may be output by filtering a separate BRIR on the audio signal.

Figure 12:
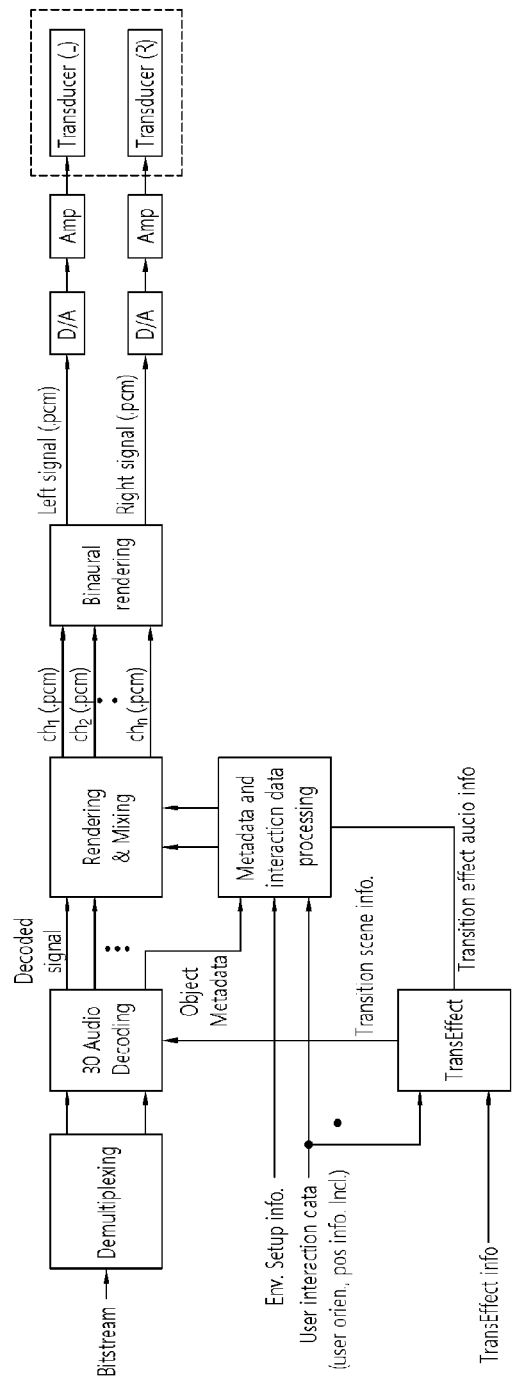
FIG. 12 is a block diagram illustrating a configuration of a 3D audio data reception apparatus according to another embodiment.

FIG. 12 is a block diagram illustrating a configuration of a 3D audio data reception apparatus according to another embodiment.

FIG. 12 is a block diagram of a 3D audio decoder including a transition effect. A bitstream is input to a demultiplexing stage before being input to a 3D audio decoding stage, so that audio data and decoding configuration related information may be parsed. The 3D audio decoding stage may decode audio data with reference to the decoding configuration information and output decoded signals and object metadata. The object metadata is input to a metadata and interaction data processing stage and may be modified by reproduction environment information and user interaction information. Additionally signaled transition effect information is transmitted to the decoder as scene information about a position to be changed with reference to information about a position that has been changed by the user or a position to which the user desires to be changed to decode audio data related to a corresponding scene. At the same time, transmission effect audio related information may be transmitted to a rendering and mixing stage together with the audio data. Next, the rendering and mixing stage may output channel signals ch1(.pcm), ch2(.pcm), . . . , chN(.pcm)) according to a configured reproduction environment. If the user desires to reproduce a signal in a headphone environment, a binaural rendering stage may output binaural rendered signals Left signal(.pcm) and Right signal(.pcm)) by immediately filtering the output channel signals. The two binaurally rendered signals may be reproduced by a left transducer and a right transducer of the headphone through a D/A converter and an amplifier.

An embodiment of the present disclosure may be applied when audio rendering is performed in consideration of change factors related to a scene when user position information is changed in an environment in which scenes captured or produced at a plurality of positions such as a hot spot are used. Capturing a plurality of audio scenes may be related to an acquisition stage. Since a transition effect may affect decoding and rendering according to change in the position of the user, the transition effect may be related to the audio decoding stage and the audio rendering stage.

Figure 13:
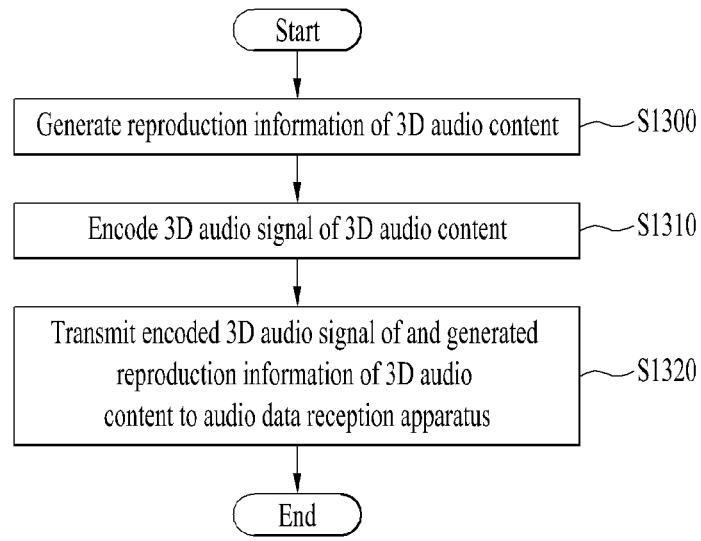
FIG. 13 is a flowchart illustrating an operation method of an audio data transmission apparatus according to an embodiment.
Figure 14:
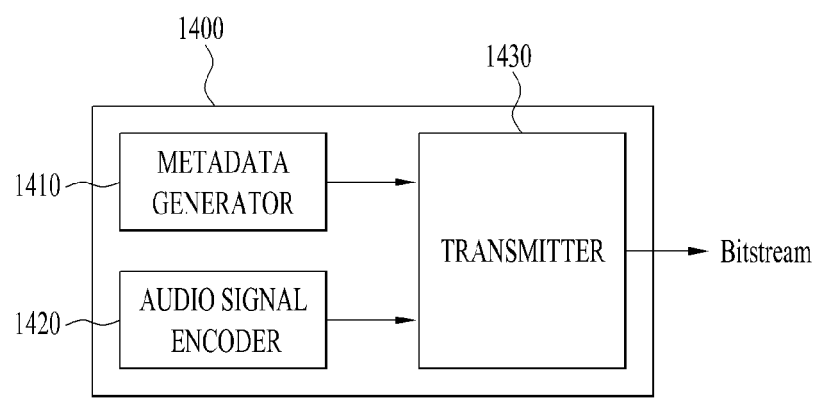
FIG. 14 is a block diagram illustrating a configuration of an audio data transmission apparatus according to an embodiment.

FIG. 13 is a flowchart illustrating an operation method of an audio data transmission apparatus according to an embodiment, and FIG. 14 is a block diagram illustrating a configuration of an audio data transmission apparatus according to an embodiment.

Each step disclosed in FIG. 13 may be based on the description given above with reference to FIGS. 5 to 12. Accordingly, in describing each step of FIG. 13, a detailed description overlapping with that given above with reference to FIGS. 5 to 12 will be omitted or simplified.

As disclosed in FIG. 14, an audio data transmission apparatus 1400 according to an embodiment may include a metadata generator 1410, an audio signal encoder 1420, and a transmitter 1430. However, in some cases, all of the components illustrated in FIG. 14 may not be essential components of the audio data transmission apparatus 1400, and the audio data transmission apparatus 1400 may be implemented by more or fewer components than the components illustrated in FIG. 14.

In the audio data transmission apparatus 1400 according to an embodiment, the metadata generator 1410, the audio signal encoder 1420, and the transmitter 1430 may be implemented as separate chips, or at least two or more components thereof may be implemented by a single chip.

The audio data transmission apparatus 1400 according to an embodiment may generate reproduction information of 3D audio content (S1300). More specifically, the metadata generator 1410 of the audio data transmission apparatus 1400 may generate the reproduction information of 3D audio content.

In one embodiment, the 3D audio content may be Virtual Reality (VR) content or Augmented Reality (AR) content of a 3DoF, 3DoF+, or 6DoF environment.

In an embodiment, the reproduction information may include information about a transition effect of the 3D audio content.

In an embodiment, the information about the transition effect may include at least one of information about the total number of at least one scene included in the 3D audio content, scene index information for identifying each of the at least one scene, information about the total number of transition positions defined for each of the at least one scene, transition position index information for identifying each of a plurality of transition positions, transition position information, index information of a scene to be reproduced at a transmission position, information about the type of the transition effect, information about the type of an audio signal to be used when applying the transition effect, information about whether a gain value is present in the audio signal to be used when applying the transition effect, or information about the gain value.

In one example, the information about the total number of at least one scene included in the 3D audio content may be represented as numScenes, the scene index information for identifying each of the at least one scene may be represented as Scene_idx, the information about the total number of transition positions defined for each of the at least one scene may be represented as numTransEffectPos, the transition position index information for identifying each of a plurality of transition positions may be represented as TranPos_idx, the transition position information may be represented as TranPos_azimuth, TranPos_elevation, and TranPos_distance, the index information of a scene to be reproduced at a transition position may be represented as TransScene_idx, the information about the type of the transition effect may be represented as TransEffectType, the information about the type of an audio signal to be used when applying the transition effect may be represented as TransEffectAudioType, the information about whether a gain value is present in the audio signal to be used when applying the transition effect may be represented as TransEffectAudioHasGain, and the information about the gain value may be represented as TransEffectAudio_gain.

In an embodiment, the information about the type of the transition effect may include at least one of a fadein-fadeout type, a Doppler type, a reverberation type, or a binaural rendering type.

In one example, the fadein-fadeout type may be represented as FADEIN_FADEOUT, the Doppler type may be represented as DOPPLER, the reverberation type may be represented as REVERBERATION, and the binaural rendering type may be represented as BINAURAL RENDERING.

In one embodiment, the information about the type of the audio signal to be used when applying the transition effect may include at least one of a natural sound type, a synthetic sound type, or a spoken text type. The spoken text type may include at least one of a spoken guide text type, a spoken information text type, or a spoken direction text type.

In one example, the natural sound type may be represented as NATURAL SOUND, the synthetic sound type may be represented as SYNTHETIC SOUND, the spoken guide text type may be represented as SPOKEN_TEXT (GUIDE), the spoken information text type may be represented as SPOKEN_TEXT (INFORMATION), and the spoken direction text type may be represented as SPOKEN_TEXT (DIRECTION).

In an embodiment, the information about the transition effect may further include a transition effect audio index for identifying each of a plurality of transition effects applied to one scene. In one example, the transition effect audio index may be represented as TransEffectAudio_idx.

In an embodiment, the reproduction information may be included in a 3D audio stream. The 3D audio stream may include a packet including the information about the transition effect.

In one embodiment, the packet including the information about the transition effect may be an MHTRA packet.

In an embodiment, the information about the type of the audio signal may further include a transition effect audio PCM type indicating that the audio signal to be used when applying the transition effect is a PCM signal.

In an embodiment, when the type of the audio signal is the transition effect audio PCM type, a payload syntax of a packet supporting the PCM signal may include PCM related information.

In one embodiment, the PCM related information may include at least one of information about the total number of PCM signals, information about the total number of PCM signals to be used when applying the transition effect, information about the sampling rate of the PCM signal, information about the number of bits per sample of the PCM signal, information about the frame size of the PCM signal, information about the fixed frame size of the PCM signal, ID information for identifying the PCM signal, information about whether the PCM signal is used when applying the transition effect, information about the loudness value of the PCM signal, information about an attenuation gain value applied to another audio signal when reproducing the PCM signal, information about whether the audio signal is interleaved, information about the total number of PCM signals in a frame, information about the total number of PCM signals to be used when applying the transition effect in the frame, or information about the variable frame size of the PCM signal.

In one example, the information about the total number of PCM signals may be represented as numPcmSignals, the information about the total number of PCM signals to be used when applying the transition effect may be represented as numTransEffectAudioPcmSignals, the information about the sampling rate of the PCM signal may be represented as pcmSamplingRateIndex, the information about the number of bits per sample of the PCM signal may be represented as pcmBitsPerSample, the information about the frame size of the PCM signal may be represented as pcmFrameSizeIndex, the information about the fixed frame size of the PCM signal may be represented as pcmFixFrameSize, the ID information for identifying each of the PCM signals may be represented as pcmSignal_ID, the information about whether the PCM signal is used when applying the transition effect may be represented as isTransEffectAudioPcmSignal, the information about the loudness value of the PCM signal may be represented as bsPcmLoudnessValue, the information about an attenuation gain value applied to another audio signal when reproducing the PCM signal may be represented as bsPcmAttenuationGain, the information about whether the audio signal is interleaved may be represented as interleavedData, the information about the total number of PCM signals in a frame may be represented as numPcmSignalsInFrame, and the information about the total number of PCM signals to be used when applying the transition effect in the frame may be represented as numTransEffectAudioSignalsInFrame, and the information about the variable frame size of the PCM signal may be represented as pcmVarFrameSize.

According to the audio data transmission apparatus 1400 and the operation method of the audio data transmission apparatus 1400 illustrated in FIGS. 13 and 14, the audio data transmission apparatus 1400 may generate reproduction information of 3D audio content (S1300), encode a 3D audio signal of the 3D audio content (S1310), and transmit the encoded 3D audio signal and the generated reproduction information of the 3D audio content to an audio data reception apparatus (S1320). The reproduction information may include information about a transition effect of the 3D audio content. In accordance with S1300 to S1320, the audio data reception apparatus may efficiently apply the transition effect in rendering (or reproducing) the 3D audio signal for the 3D audio content (e.g. an audio signal based on VR content of a 3DoF, 3DoF+, or 6DoF environment or an audio signal based on AR content of the 3DoF, 3DoF+, or 6DoF environment) by transmitting the information about the transition effect of the 3D audio content to the audio data reception apparatus.

Figure 15:
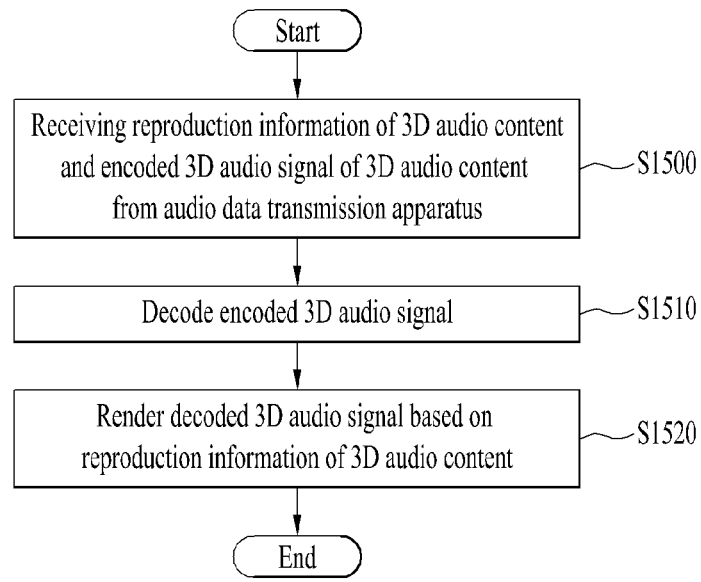
FIG. 15 is a flowchart illustrating an operation of an audio data reception apparatus according to an embodiment.
Figure 16:
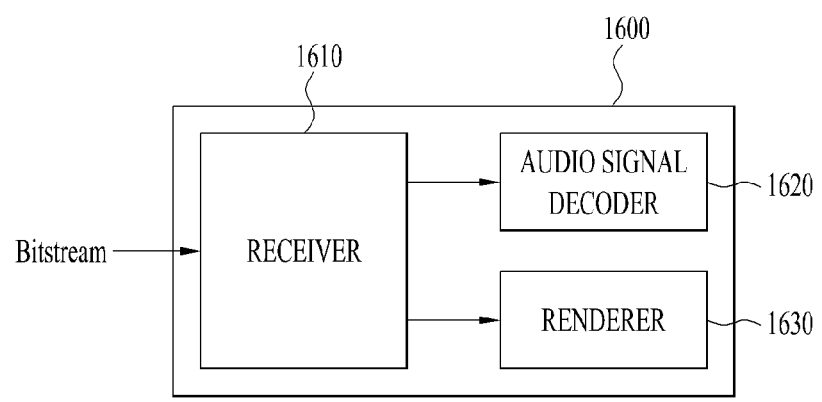
FIG. 16 is a block diagram illustrating a configuration of an audio data reception apparatus according to an embodiment.

FIG. 15 is a flowchart illustrating an operation of an audio data reception apparatus according to an embodiment, and FIG. 16 is a block diagram illustrating a configuration of an audio data reception apparatus according to an embodiment.

Each step illustrated in FIG. 15 may be performed by an audio data reception apparatus 1600 disclosed in FIG. 16, the 3D audio data reception apparatus illustrated in FIG. 6, or the 3D audio data reception apparatus illustrated in FIG. 12. In one example, S1510 of FIG. 15 may be performed by the MPEG-H 3D audio core decoding module of the 3D audio data reception apparatus illustrated in FIG. 6 or by the audio signal decoder 1620 illustrated in FIG. 16. S1520 of FIG. 15 may be performed by the rendering and mixing module of the 3D audio data reception apparatus illustrated in FIG. 6 or by the renderer 1630 illustrated in FIG. 16. In addition, each step disclosed in FIG. 15 may be based on the above description given with respect to FIGS. 5 to 12. Accordingly, in describing each step of FIG. 15, details overlapping with those described above in FIGS. 5 to 12 will be omitted or simplified.

In addition, since the audio data reception apparatus 1600 illustrated in FIG. 16 and the audio data transmission apparatus 1400 illustrated in FIG. 14 transmit and receive audio data to and from each other, the audio data reception apparatus 1600 and the audio data transmission apparatus 1400 may be closely related to each other. Accordingly, in describing FIGS. 15 and 16, details overlapping with those described above in FIGS. 14 and 15 will be omitted or simplified.

As disclosed in FIG. 16, the audio data reception apparatus 1600 according to an embodiment may include a receiver 1610, an audio signal decoder 1620, and a renderer 1630. However, in some cases, all of the components illustrated in FIG. 16 may not be essential components of the audio data reception apparatus 1600, and the audio data reception apparatus 1600 may be implemented by more or fewer components than the components illustrated in FIG. 16.

In the audio data reception apparatus 1600 according to an embodiment, the receiver 1610, the audio signal decoder 1620, and the renderer 1630 may be implemented as separate chips, or at least two or more components may be implemented through a single chip.

The audio data receiving apparatus 1600 according to an embodiment may receive reproduction information of 3D audio content and an encoded 3D audio signal of the 3D audio content from the audio data transmission apparatus 1400 (S1500). More specifically, the receiver 1610 of the audio data reception apparatus 1600 may receive the reproduction information of the 3D audio content and the encoded 3D audio signal of the 3D audio content from the audio data transmission apparatus 1400.

In an embodiment, the 3D audio content may be VR content or AR content of a 3DoF, 3DoF+, or 6DoF environment.

In an embodiment, the reproduction information may include information about a transition effect of the 3D audio content.

In an embodiment, the information about the transition effect may include at least one of information about the total number of at least one scene included in the 3D audio content, scene index information for identifying each of the at least one scene, information about the total number of transition positions defined for each of the at least one scene, transition position index information for identifying each of a plurality of transition positions, transition position information, index information of a scene to be reproduced at a transmission position, information about the type of the transition effect, information about the type of an audio signal to be used when applying the transition effect, information about whether a gain value is present in the audio signal to be used when applying the transition effect, or information about the gain value.

In an embodiment, the information about the type of the transition effect may include at least one of a fadein-fadeout type, a Doppler type, a reverberation type, or a binaural rendering type.

In one embodiment, the information about the type of the audio signal to be used when applying the transition effect may include at least one of a natural sound type, a synthetic sound type, or a spoken text type. The spoken text type may include at least one of a spoken guide text type, a spoken information text type, or a spoken direction text type.

In an embodiment, the information about the transition effect may further include a transition effect audio index for identifying each of a plurality of transition effects applied to one scene.

The audio data reception apparatus 1600 according to an embodiment may acquire transition effect interaction information based on input of a user.

In an embodiment, the transition effect interaction information may include at least one of information about whether the transition effect is applied, index information of a scene selected by the user, information about whether predefined position information is used, index information representing a predefined transition position, or information about a non-predefined transition position.

In an embodiment, the transition effect interaction information may further include selection information about a transition effect type and selection information about an audio signal type used when applying the transition effect.

In an embodiment, the reproduction information may be included in a 3D audio stream. The 3D audio stream may include a packet including the information about the transition effect.

In one embodiment, the packet including the information about the transition effect may be an MHTRA packet.

In an embodiment, the information about the type of the audio signal may further include a transition effect audio PCM type indicating that the audio signal to be used when applying the transition effect is a PCM signal.

In an embodiment, when the type of the audio signal is the transition effect audio PCM type, a payload syntax of a packet supporting the PCM signal may include PCM related information.

In an embodiment, the PCM related information may include at least one of information about the total number of PCM signals, information about the total number of PCM signals to be used when applying the transition effect, information about the sampling rate of the PCM signal, information about the number of bits per sample of the PCM signal, information about the frame size of the PCM signal, information about the fixed frame size of the PCM signal, ID information for identifying the PCM signal, information about whether the PCM signal is used when applying the transition effect, information about the loudness value of the PCM signal, information about an attenuation gain value applied to another audio signal when reproducing the PCM signal, information about whether the audio signal is interleaved, information about the total number of PCM signals in a frame, information about the total number of PCM signals to be used when applying the transition effect in the frame, or information about the variable frame size of the PCM signal.

The audio data reception apparatus 1600 according to an embodiment may decode the encoded 3D audio signal (S1510). More specifically, the audio signal decoder 1620 of the audio data reception apparatus 1600 may decode the encoded 3D audio signal.

The audio data receiving apparatus 1600 according to an embodiment may render the decoded 3D audio signal based on the reproduction information of the 3D audio content (S1520). More specifically, the renderer 1630 of the audio data reception apparatus 1600 may render the decoded 3D audio signal based on the reproduction information of the 3D audio content.

According to the audio data reception apparatus 1600 and the operation method of the audio data reception apparatus 1600 illustrated in FIGS. 15 and 16, the audio data reception apparatus 1600 may receive reproduction information of 3D audio content and an encoded 3D audio signal of the 3D audio content from the audio data transmission apparatus 1400 (S1500), decode the encoded 3D audio signal (S1510), and render the decoded 3D audio signal based on the reproduction information of the 3D audio content (S1520). The reproduction information may include information about a transition effect of the 3D audio content. In accordance with S1500 to S1520, the audio data reception apparatus S1600 may effectively apply the transition effect in rendering (reproducing) the 3D audio signal for the 3D audio content (e.g., an audio signal based on VR content of a 3DoF, 3DoF+, or 6DoF environment or an audio signal based on AR content of the 3DoF, 3DoF+, or 6DoF environment).

The above-described modules may be omitted or replaced by other modules that perform similar/same operations according to an embodiment.

The above-described parts, modules or units may be processors or hardware parts executing consecutive processes stored in a memory (or a storage unit). The steps described in the aforementioned embodiments may be performed by processors or hardware parts. Modules/blocks/units described in the above embodiments may operate as hardware/processors. The methods proposed by the present disclosure may be executed as code. Such code may be written on a processor-readable storage medium and thus may be read by a processor provided by an apparatus.

In the above exemplary systems, although the methods have been described based on the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

When the embodiments of the present disclosure are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

The invention claimed is:

1. A method of receiving audio data, performed by an audio data reception apparatus, the method comprising:
receiving an encoded audio data and metadata;
decoding the encoded audio data; and
rendering the decoded audio data based on the metadata;
wherein the metadata includes reproduction information for the audio data,
wherein the reproduction information includes audio transition effect information, wherein the audio transition effect information includes audio scene index information for identifying each audio scene, wherein the audio transition effect information further includes transition position index information for identifying a transition position of the each audio scene, and wherein the audio transition effect information further includes information about a total number of at least one audio scene included in the audio data, and information for a total number of transition positions defined for each of the at least one audio scene.

2. The method of claim 1, wherein the audio transition effect information further includes at least one of transition position information, index information of an audio scene to be reproduced at a transition position, information for a type of the audio transition effect, information for whether a gain value is present in an audio signal to be used when applying the audio transition effect, or information about the gain value.

3. The method of claim 2, wherein the information for the type of the audio transition effect includes at least one of a natural sound type, a synthetic sound type, or a spoken text type, and wherein the spoken text type includes at least one of a spoken guide text type, a spoken information text type, or a spoken direction text type.

4. The method of claim 1, wherein the receiving receives a transition effect interaction information based on input of a user, wherein the transition effect interaction information includes at least one of information for whether the audio transition effect is applied, index information of an audio scene selected by the user, information for whether predefined position information is used, index information representing a predefined transition position, or information about a non-predefined transition position.

5. The method of claim 2, wherein the audio transition effect information further includes a transition effect audio index for identifying each audio transition effects applied to one scene.

6. The method of claim 4, wherein the transition effect interaction information further includes selection information for a transition effect type and selection information for an audio signal type used when applying the audio transition effect.

7. The method of claim 1, wherein the reproduction information is included in a 3D audio stream and the 3D audio stream includes a packet including the audio transition effect information.

8. The method of claim 3, wherein the information for the type of the audio transition effect further includes a transition effect audio Pulse-Code Modulation (PCM) type indicating that the audio signal to be used when applying the audio transition effect is a PCM signal.

9. The method of claim 8, wherein a payload syntax of a packet supporting the PCM signal includes PCM related information when the type of the audio signal is the transition effect audio PCM type.

10. The method of claim 9, wherein the PCM related information includes at least one of information about a total number of PCM signals, information about a total number of PCM signals to be used when applying the audio transition effect, information about a sampling rate of the PCM signal, information about the number of bits per sample of the PCM signal, information about a frame size of the PCM signal, information about a fixed frame size of the PCM signal, identification (ID) information for identifying the PCM signal, information about whether the PCM signal is used when applying the audio transition effect, information about a loudness value of the PCM signal, information about an attenuation gain value applied to another audio signal when reproducing the PCM signal, information about whether the audio signal is interleaved, information about a total number of PCM signals in a frame, information about a total number of PCM signals to be used when applying the transition effect in the frame, or information about a variable frame size of the PCM signal.

11. A method of transmitting audio data, performed by an audio data transmission apparatus, the method comprising:
acquiring audio data and generating metadata;
encoding the audio data; and
transmitting the encoded audio data and the metadata;
wherein the metadata includes reproduction information for the audio data,
wherein the reproduction information includes audio transition effect information,
wherein the audio transition effect information includes audio scene index information for identifying each audio scene,
wherein the audio transition effect information further includes transition position index information for identifying a transition position of the each audio scene, and
wherein the audio transition effect information further includes information about a total number of at least one audio scene included in the audio data, and information for a total number of transition positions defined for each of the at least one audio scene.

12. The method of claim 11, wherein the audio transition effect information further includes at least one of transition position information, index information of an audio scene to be reproduced at a transition position, information for a type of the audio transition effect, information for whether a gain value is present in an audio signal to be used when applying the audio transition effect, or information about the gain value.

13. An audio data reception apparatus for receiving audio data, comprising:
a receiver configured to receive audio data and metadata;
a decoder configured to decode the encoded audio data; and
a renderer configured to render the decoded audio data based on the metadata,
wherein the metadata includes a reproduction information,
wherein the reproduction information includes audio transition effect information for the audio data,
wherein the audio transition effect information includes audio scene index information for identifying each audio scene,
wherein the audio transition effect information further includes transition position index information for identifying a transition position of the each audio scene, and
wherein the audio transition effect information further includes information about a total number of at least one audio scene included in the audio data, and information for a total number of transition positions defined for each of the at least one audio scene.

* * * * *